(12) United States Patent
Yoshida et al.

(10) Patent No.: US 8,605,314 B2
(45) Date of Patent: Dec. 10, 2013

(54) APPARATUS, METHOD AND COMPUTER-READABLE STORAGE MEDIUM FOR OUTPUTTING IMAGES TO ELECTRONIC PAPER

(75) Inventors: Hiroki Yoshida, Takatsuki (JP); Mitsunori Nakamura, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 626 days.

(21) Appl. No.: 12/882,871

(22) Filed: Sep. 15, 2010

(65) Prior Publication Data

US 2011/0063673 A1 Mar. 17, 2011

(30) Foreign Application Priority Data

Sep. 16, 2009 (JP) ................................. 2009-214688

(51) Int. Cl.
*G06F 3/12* (2006.01)
(52) U.S. Cl.
USPC ......... 358/1.15; 358/1.13; 358/1.14; 358/1.1; 345/531; 345/530; 709/229
(58) Field of Classification Search
None
See application file for complete search history.

(56) References Cited

U.S. PATENT DOCUMENTS

| 7,570,418 B2 | 8/2009 | Moriya et al. |
| 2005/0246621 A1 | 11/2005 | Ogawa et al. |
| 2009/0085930 A1* | 4/2009 | Shoya et al. .................. 345/619 |

FOREIGN PATENT DOCUMENTS

| JP | 2000-292777 | 10/2000 |
| JP | 2004-38554 | 2/2004 |
| JP | 2004-110648 | 4/2004 |
| JP | 2005-242792 | 9/2005 |
| JP | 2005-267173 | 9/2005 |
| JP | 2005-316672 | 11/2005 |
| JP | 2005-327158 | 11/2005 |
| JP | 2005-327160 | 11/2005 |
| JP | 2006-39107 | 2/2006 |
| JP | 2008-158337 | 7/2008 |
| JP | 2009-31737 | 2/2009 |

OTHER PUBLICATIONS

Japanese Notification of Reason(s) for Refusal mailed Aug. 16, 2011, directed to counterpart Japanese Patent Application No. 2009-214688; 8 pages.

* cited by examiner

*Primary Examiner* — Paul F Payer
(74) *Attorney, Agent, or Firm* — Morrison & Foerster LLP

(57) ABSTRACT

An apparatus for outputting an image is provided. The apparatus includes a detection portion that detects a state of electronic paper placed on a predetermined location, and a transmission portion that sends, to the electronic paper, image data for displaying an image depending on the state of the electronic paper.

18 Claims, 22 Drawing Sheets

————— OPERATION SIDE

10ft  10gt

——— OPERATION SIDE

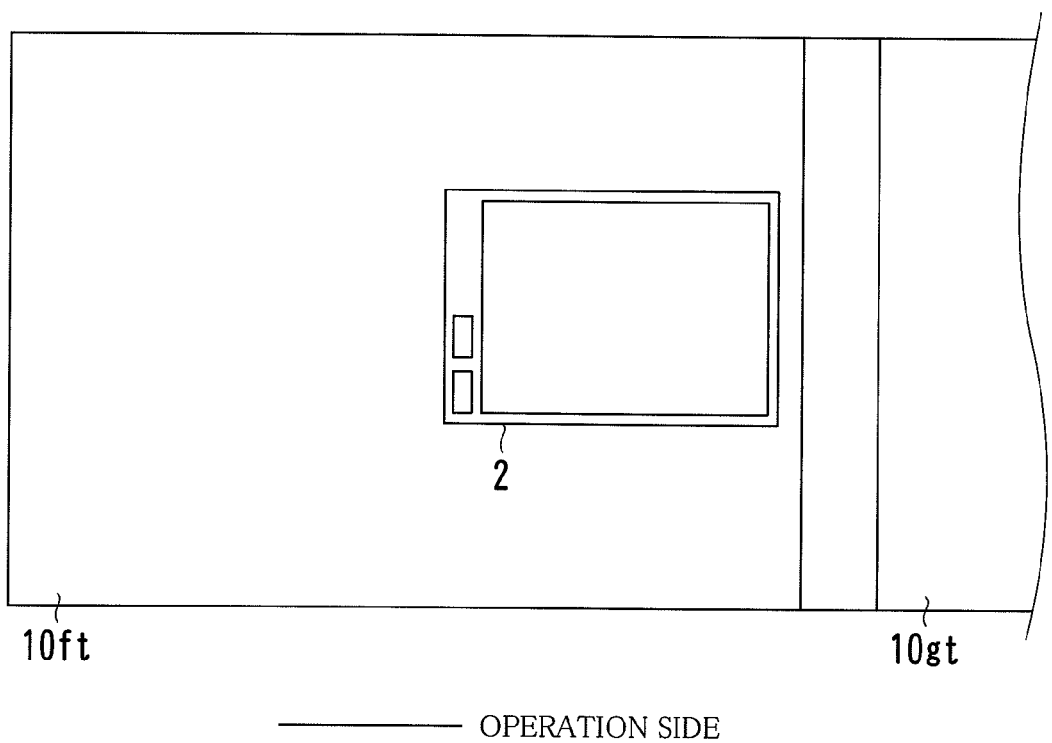

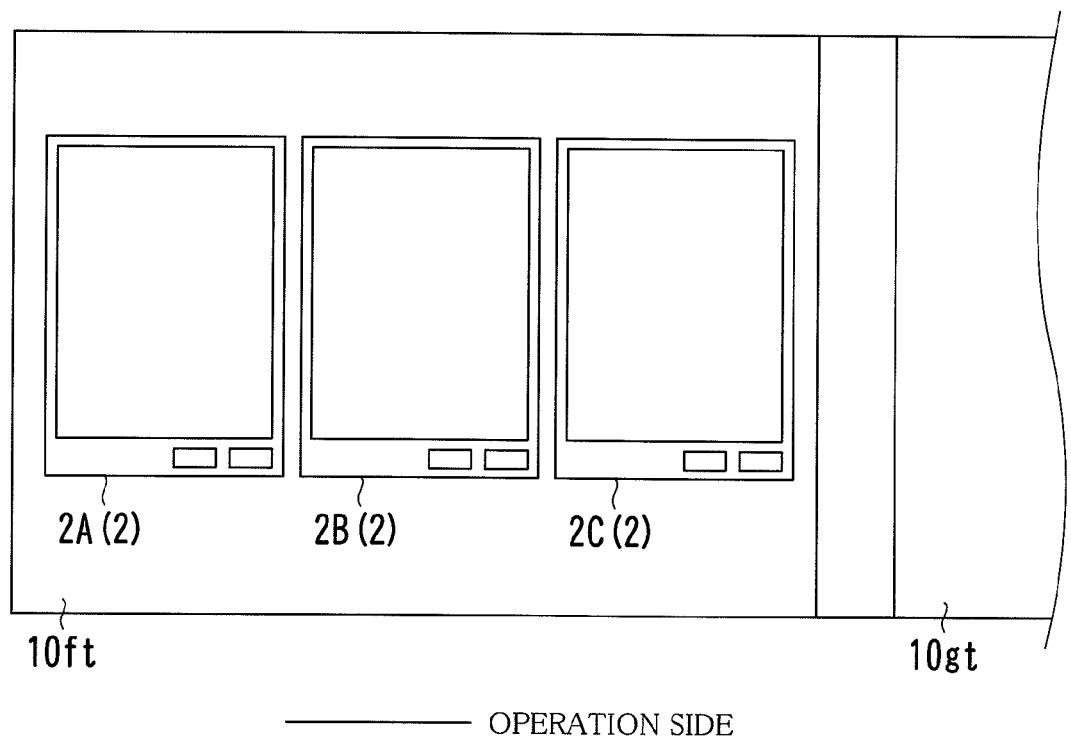

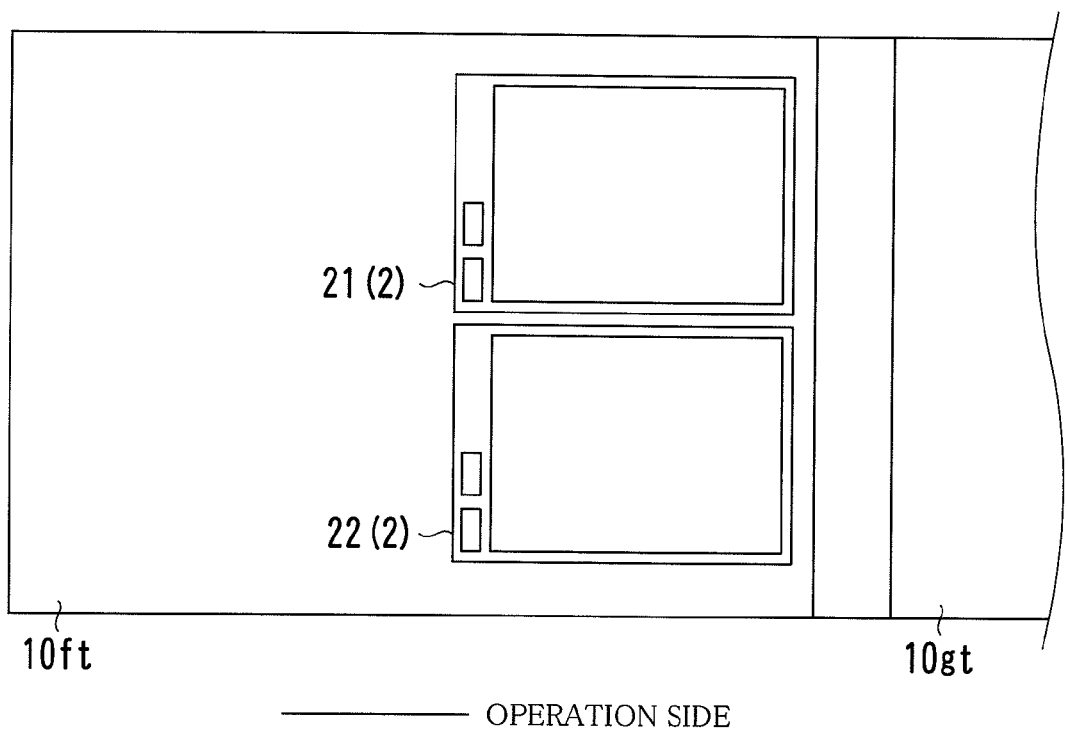

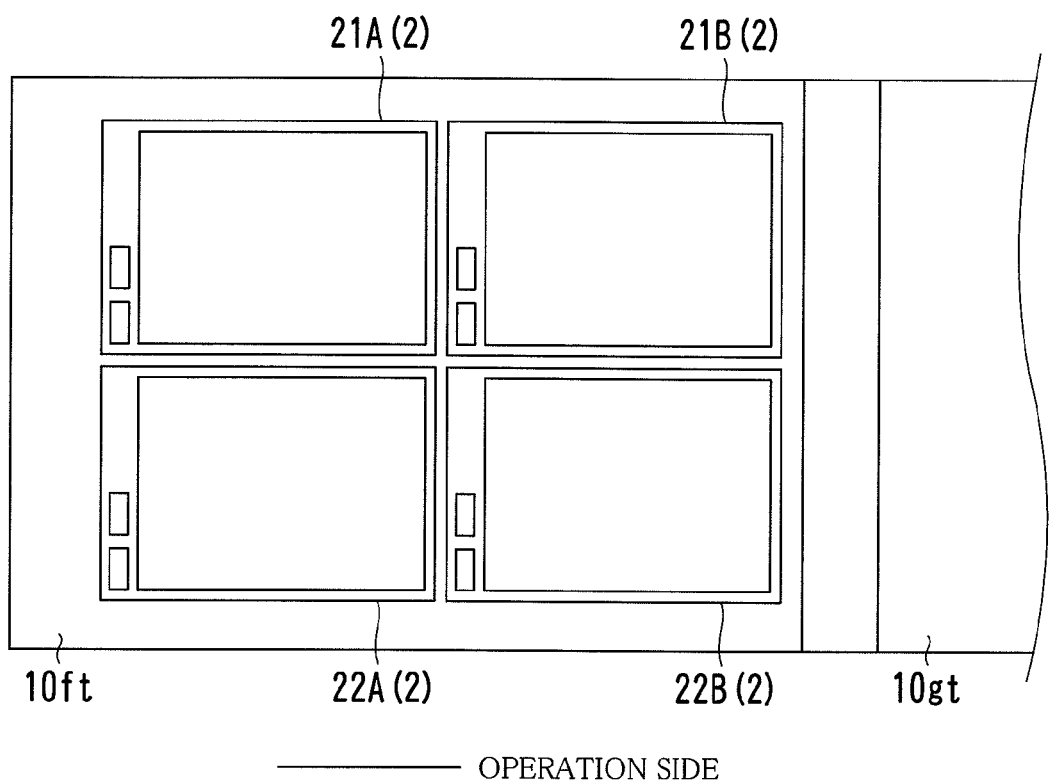

PAGE 1

APPARATUS, METHOD AND COMPUTER-READABLE STORAGE MEDIUM FOR OUTPUTTING IMAGES TO ELECTRONIC PAPER

This application is based on Japanese patent application No. 2009-214688 filed on Sep. 16, 2009, the contents of which are hereby incorporated by reference.

BACKGROUND OF THE INVENTION

1. Field of the Invention

The present invention relates to an apparatus, a method, and the like for outputting an image to electronic paper.

2. Description of the Related Art

Image forming apparatuses having a variety of functions, such as copying, PC printing, scanning, faxing, and file server, have recently come into widespread use. Such image forming apparatuses are sometimes called "multifunction devices", "Multi-Function Peripherals (MFPs)", or the like.

In recent years, electronic paper has been attracting attention. As compared with a Liquid Crystal Display (LCD) and the like, the electronic paper is configured to keep displaying images thereon at very low power consumption, or, even without drawing electricity. Further, the electronic paper is configured to display an image by using reflected light as with ordinary paper, which results in the less adverse effect on human eyes. The electronic paper is reused more easily than ordinary paper. The electronic paper also has characteristics of being thin and flexible like ordinary paper.

There are proposed methods for utilizing these characteristics of electronic paper or methods for protecting information displayed on the electronic paper.

The following method is disclosed in Japanese Laid-open Patent Publication No. 2004-038554. In rewriting display content of electronic paper in accordance with instructions received from outside of the electronic paper, an information display device allows execution of the instructions only when there is a match between a cipher code for checking a user inputted externally together with the instructions and a pre-recorded cipher code.

Another method is proposed in which an image is printed on electronic paper as with the case of real paper, the electronic paper is ejected from an ejecting roll, and is stored into a storing roll (Japanese Laid-open Patent Publication No. 2004-110648).

According to another method, data of temporary output jobs is stored into electronic paper and a user makes a confirmation of jobs through the electronic paper. Thereby, only a necessary job is confirmed, and an image corresponding only to the confirmed job can be printed onto paper (Japanese Laid-open Patent Publication No. 2005-242792).

According to another method, electronic paper set as a master provides document electronic data saved in a memory to slave electronic paper under the control of the master electronic paper, so that the document electronic data is displayed on display parts thereof (Japanese Laid-open Patent Publication No. 2005-267173).

According to another method, a transfer device connectable to a PC or a network wirelessly communicates with a display device having a wireless tag and electronic paper to perform individual identification, and transfers display information on the basis thereof (Japanese Laid-open Patent Publication No. 2005-316672).

Another method is proposed in which, when electronic paper is connected to a stocker device, the stocker device erases a document image displayed on the electronic paper (Japanese Laid-open Patent Publication No. 2005-327158).

According to another method, a predetermined process is performed on electronic paper placed on a tray. The predetermined process is, for example, to print out an image displayed on the electronic paper onto paper, to send the image via electronic mail, or to erase the image displayed on the electronic paper (Japanese Laid-open Patent Publication No. 2005-327160).

As discussed above, there are proposed a variety of processes performed on electronic paper. However, as the number and type of processes performed on electronic paper increase, the operation performed by a user becomes more complicated. In particular, the type of processes is increasing in an image forming apparatus such as an MFP aside from electronic paper-related processes. This makes the operation performed by a user complex. In view of this, there is a need to simplify operation for the electronic paper-related processes.

SUMMARY

The present disclosure is directed to solve the problems pointed out above, and therefore, an object of an embodiment of the present invention is to enable a user to perform operation for a process relating to electronic paper more easily than is conventionally possible.

An apparatus for outputting an image according to an aspect of the present invention includes a detection portion that detects a state of electronic paper placed on a predetermined location, and a transmission portion that sends, to the electronic paper, image data for displaying an image depending on the state of the electronic paper.

Preferably, if the detection portion detects, as the state, that the electronic paper is placed in such a manner that a first surface of the electronic paper faces upward, then the transmission portion sends the image data without taking security measures to protect the image data. If the detection portion detects, as the state, that the electronic paper is placed in such a manner that a second surface, different from the first surface, of the electronic paper faces upward, then the transmission portion takes the security measures to protect the image data, and sends the image data thus protected.

Alternatively, if the detection portion detects, as the state, that the electronic paper is powered, then the transmission portion may send the image data without taking security measures to protect the image data, and if the detection portion detects, as the state, that the electronic paper is not powered, then the transmission portion may take the security measures to protect the image data, and send the image data thus protected.

Alternatively, if the detection portion detects, as the state, that the electronic paper is placed in such a manner that a first surface of the electronic paper faces upward, then the transmission portion may send the image data in a manner to display both the image and another image that is already stored in the electronic paper, and if the detection portion detects, as the state, that the electronic paper is placed in such a manner that a second surface, different from the first surface, of the electronic paper faces upward, then the transmission portion may cause the electronic paper to delete said another image from the electronic paper, and send the image data.

Alternatively, if the detection portion detects, as the state, that the electronic paper is powered, then the transmission portion may send the image data in a manner to display both the image and another image that is already stored in the electronic paper, and if the detection portion detects, as the state, that the electronic paper is not powered, then the transmission portion may cause the electronic paper to delete said another image from the electronic paper, and sends the image data.

The image may correspond to each of document images of a document including a plurality of pages each of whose long sides corresponds to an up-down direction of the page. If the detection portion detects that the electronic paper is placed in such a manner that a long side of a screen of the electronic paper corresponds to a side perpendicular to an operation side of the apparatus by a user, then the transmission portion may send, as the image data, data for displaying the document images on a page-by-page basis. If the detection portion detects that the electronic paper is placed in such a manner that a short side of the screen of the electronic paper corresponds to the side perpendicular to the operation side of the apparatus, then the transmission portion may send, as the image data, data for displaying the document images for two of the pages.

The image may correspond to each of document images of a document including a plurality of pages. If the detection portion detects that a plurality of pieces of electronic paper are aligned with one another, then the transmission portion may send, as the image data, data for displaying the document images corresponding to successive pages of the document in accordance with an order in which the plurality of pieces of electronic paper are aligned.

These and other characteristics and objects of the present invention will become more apparent by the following descriptions of preferred embodiments with reference to drawings.

BRIEF DESCRIPTION OF THE DRAWINGS

FIGS. 7A and 7B are diagrams illustrating an example of how to arrange electronic paper.

FIGS. 8A and 8B are diagrams illustrating an example of how to arrange electronic paper.

DESCRIPTION OF THE PREFERRED EMBODIMENTS

Figure 1:
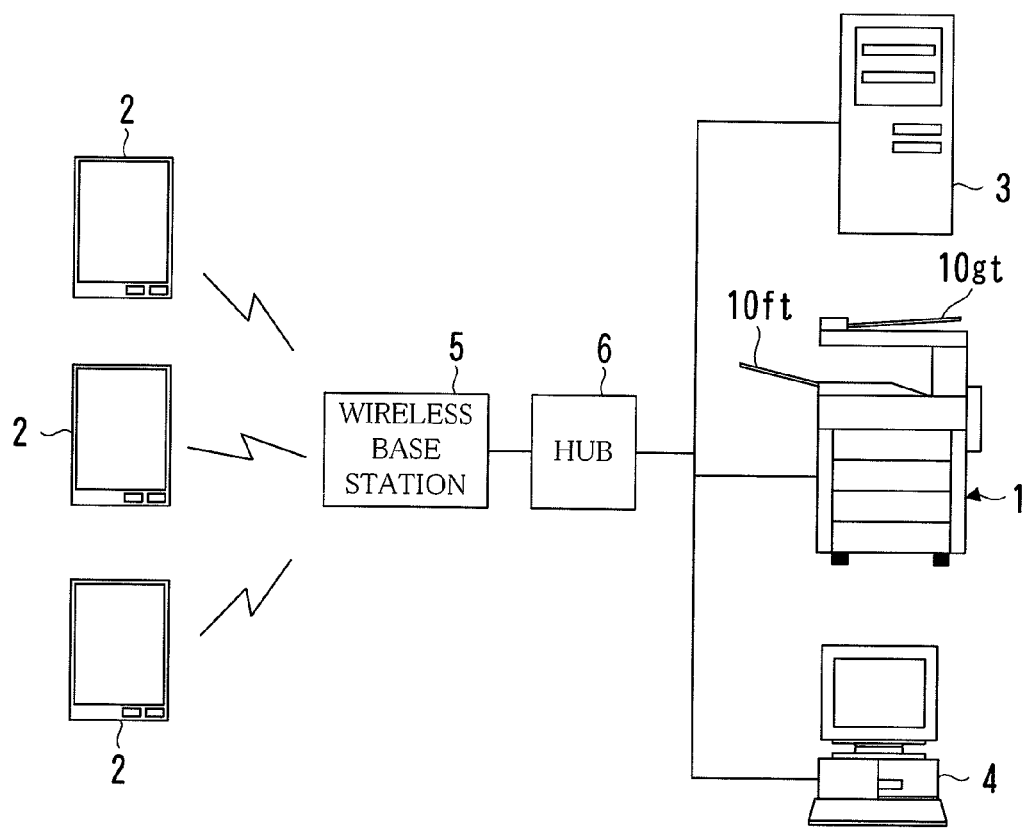
FIG. 1 is a diagram illustrating an example of the overall configuration of a network system.
Figure 2:
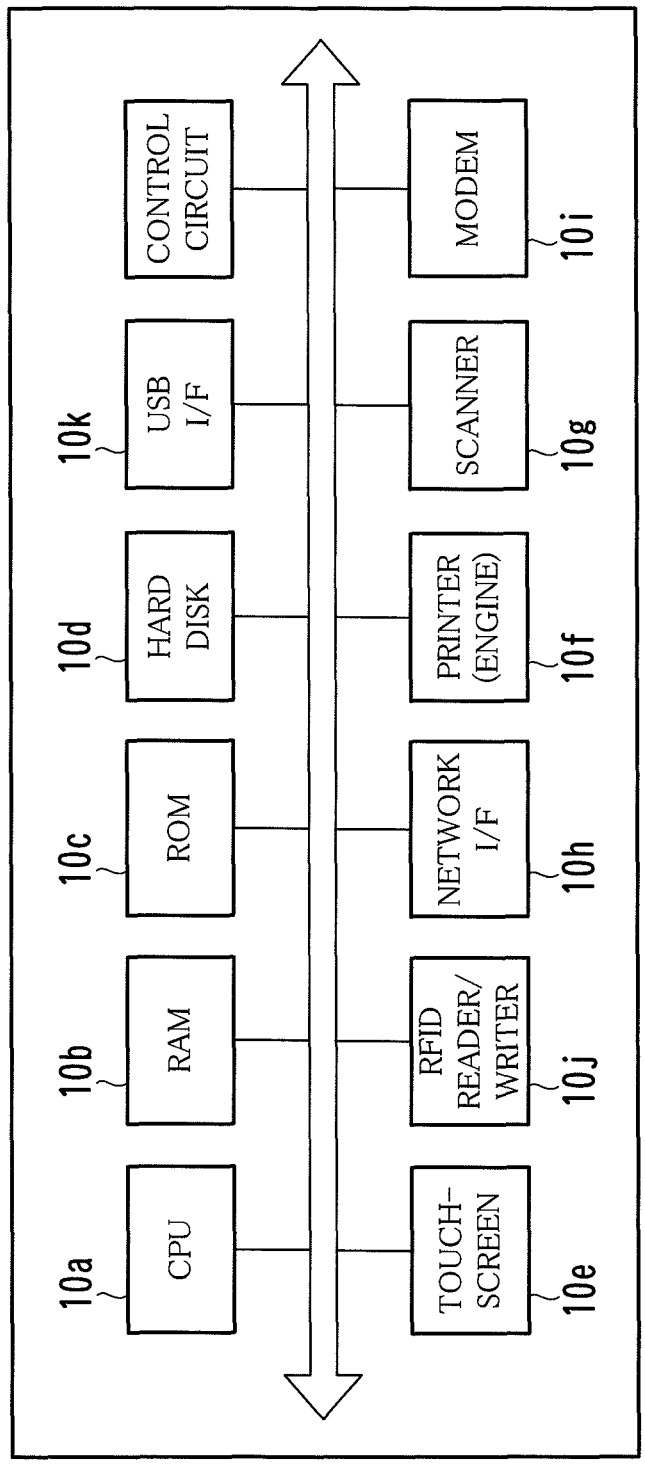
FIG. 2 is a diagram illustrating an example of the hardware configuration of an image forming apparatus.
Figure 3:
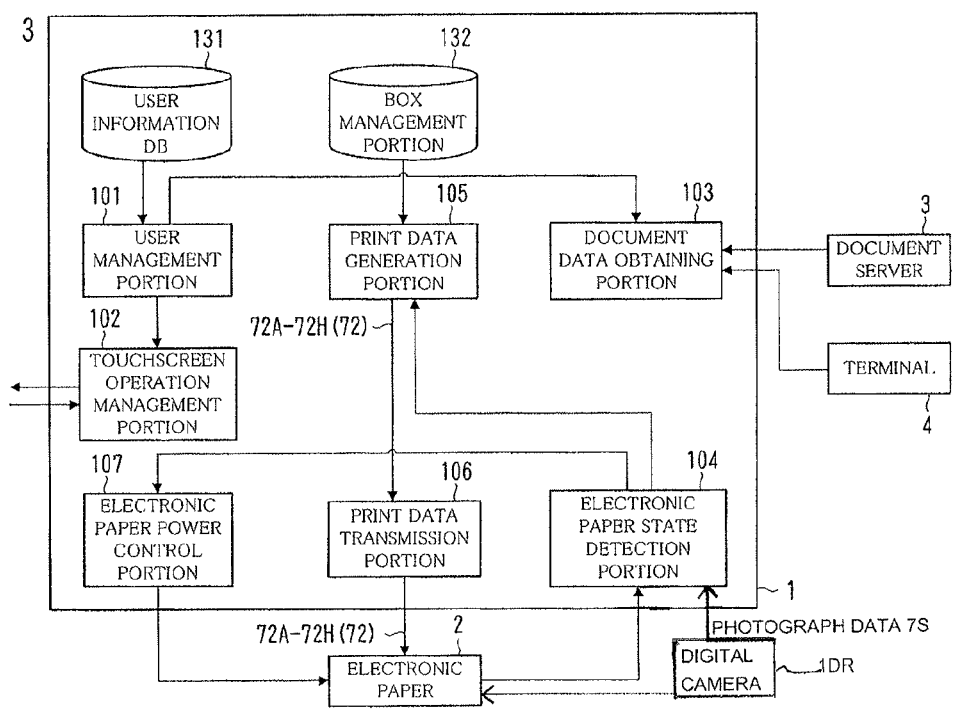
FIG. 3 is a diagram illustrating an example of the functional configuration of an image forming apparatus.
Figure 4:
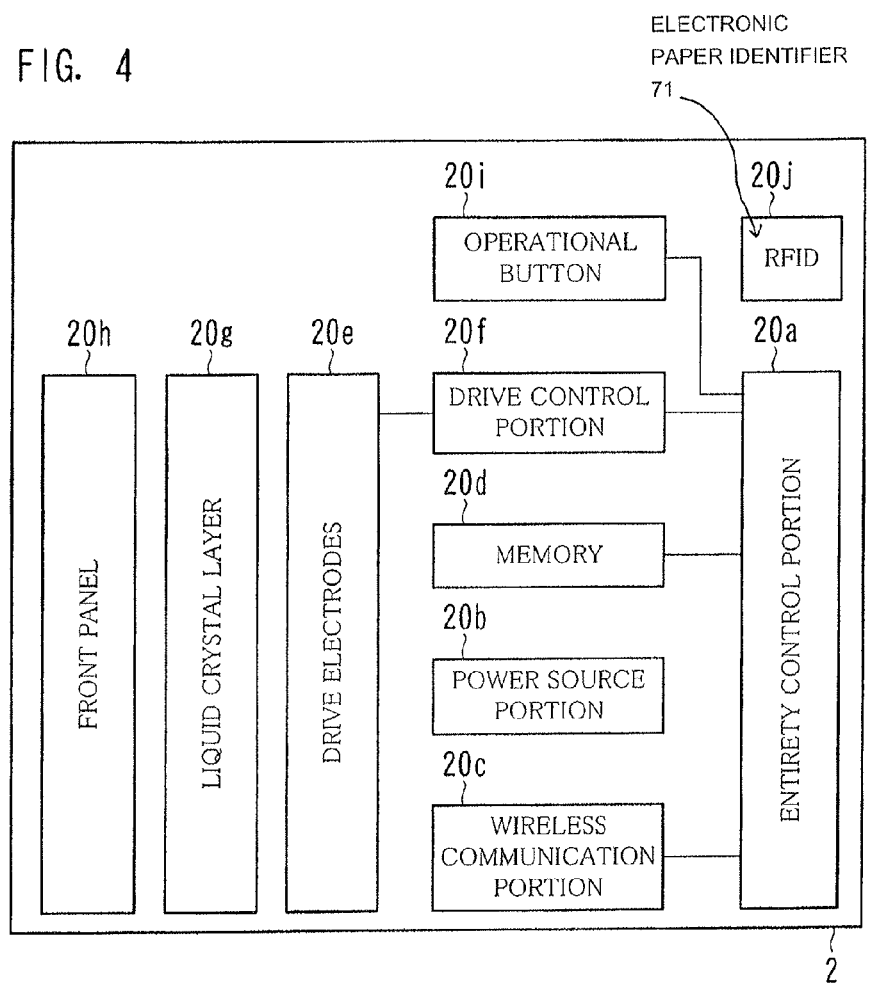
FIG. 4 is a diagram illustrating an example of the hardware configuration of electronic paper.

FIG. 1 is a diagram illustrating an example of the overall configuration of a network system NS; FIG. 2 is a diagram illustrating an example of the hardware configuration of an image forming apparatus 1; FIG. 3 is a diagram illustrating an example of the functional configuration of the image forming apparatus 1; and FIG. 4 is a diagram illustrating an example of the hardware configuration of electronic paper 2.

Referring to FIG. 1, the network system NS is configured of the image forming apparatus 1, a plurality of pieces of electronic paper 2, a document server 3, a terminal 4, a wireless base station 5, a hub 6, and so on. The image forming apparatus 1, the document server 3, the terminal 4, and the wireless base station 5 are connected to the hub 6 each, so that these devices perform communication with one another via the hub 6.

The network system NS is installed in organizations such as business offices or public offices, and is used by members belonging to such an organization. The following is a description of an example in which the network system NS is used in an X-company. An employee of the X-company is hereinafter referred to as a "user". The user is given a unique identification (ID).

The wireless base station 5 is a device to wirelessly send and receive data to and from the electronic paper 2. In particular, the wireless base station 5 serves to relay data that is transmitted and received between the electronic paper 2 and another device. The wireless communication standards are, for example, Bluetooth or Institute of Electrical and Electronics Engineers (IEEE) 802.11.

The wireless base station 5 is installed around the image forming apparatus 1 so that the wireless base station 5 can perform communication with the electronic paper 2 connected to the image forming apparatus 1. The image forming apparatus 1 and the electronic paper 2 perform communication with each other via the wireless base station 5. The plurality of pieces of electronic paper 2 also perform communication with one another via the wireless base station 5.

The image forming apparatus 1 is an image processing apparatus generally called a multifunction device or a Multi Function Peripheral (MFP). The image forming apparatus 1 is a device that integrates a variety of functions, such as copying, PC printing (network printing), faxing, scanning, a document server function, and so on, into a single unit. The image forming apparatus 1 also has a function to display a document image containing texts, illustrations, photographs, diagrams, or the like on the electronic paper 2.

Displaying a document image on the electronic paper 2 is similar to printing a document image onto paper. In view of this, displaying a document image on the electronic paper 2 may be hereinafter referred to as, for example, "printing a document image on the electronic paper 2".

Referring to FIG. 2, the image forming apparatus 1 is configured of a Central Processing Unit (CPU) 10a, a Random Access Memory (RAM) 10b, a Read Only Memory (ROM) 10c, a hard disk 10d, a touchscreen 10e, a printer 10f, a scanner 10g, a network interface 10h, a modem 10i, a Radio Frequency Identification (RFID) reader/writer 10j, a Universal Serial Bus (USB) interface 10k, and so on.

The touchscreen 10e displays, for example, a screen for giving a message to a user, a screen for displaying the result of a process, and a screen for the user to enter a command to be given to the image forming apparatus 1. The touchscreen 10e also detects a position thereof touched (pressed) by the user and informs the CPU 10a of the touched position.

The scanner 10g is a device that scans document images depicted on paper and creates image data thereof. The scanner 10g is provided with an Automatic Document Feeder (ADF) and a document tray 10gt (see FIG. 1). The ADF serves to feed each sheet of paper of a document placed on the document tray 10gt onto a glass plate of a reading portion of the scanner 10g.

The USB interface 10k is a USB interface board for performing communication with a so-called USB device.

The printer 10f serves to print, onto paper, a document image obtained by scanning with the scanner 10g or a document image included in image data received from another device. The printer 10f is provided with a paper output tray 10ft. Paper onto which a document image has been printed, or, in other words, a printed matter, is outputted to the paper output tray 10ft.

A digital camera 1DR is placed in the vicinity of the paper output tray 10ft for the purpose of capturing an image of an object placed on the paper output tray 10ft. Photograph data 7S of an image captured by the digital camera 1DR is inputted to the image forming apparatus 1 via the USB interface 10k.

The network interface 10h is a Network Interface Card (NIC) for communicating with the document server 3 or the like according to Transmission Control Protocol/Internet Protocol (TCP/IP).

The modem 10i is a device to perform communication with another facsimile terminal via a fixed-line telephone network based on a protocol such as Group 3 (G3).

The RFID reader/writer 10j serves to read or write data from or into an RFID. In particular, the RFID reader/writer 10j reads out data from an RFID 20j provided in the electronic paper 2 or writes data thereinto. The RFID reader/writer 10j is placed at a specific position. The RFID 20j is also placed at a specific position of the electronic paper 2.

Referring to FIG. 3, the ROM 10c and the hard disk 10d store programs and data for implementing functions of a user management portion 101, a touchscreen operation management portion 102, a document data obtaining portion 103, an electronic paper state detection portion 104, a print data generation portion 105, a print data transmission portion 106, an electronic paper power control portion 107, a user information database 131, a box management portion 132, and the like. These programs are loaded into the RAM 10b as necessary, whereupon the programs are executed by the CPU 10a.

The whole or a part of the functions of the individual portions illustrated in FIG. 3, and the like may be implemented merely by hardware such as a circuit.

Referring to FIG. 4, the electronic paper 2 of FIG. 1 is configured of an entirety control portion 20a, a power source portion 20b, a wireless communication portion 20c, a memory 20d, drive electrodes 20e, a drive control portion 20f, a liquid crystal layer 20g, a front panel 20h, an operational button 20i, the RFID 20j, and so on.

The entirety control portion 20a serves to control the entire electronic paper 2. The entirety control portion 20a also executes programs described later. A CPU or the like is used as the entirety control portion 20a. The power source portion 20b serves to supply power to the individual portions of the electronic paper 2.

The wireless communication portion 20c performs communication with the image forming apparatus 1 based on the Bluetooth standards or the IEEE802.11 standards.

The memory 20d stores, therein, image data sent from the image forming apparatus 1 and information on image display.

The liquid crystal layer 20g is a layer of liquid crystal molecules of individual colors of Red, Green, and Blue (RGB). The orientation of the liquid crystal molecules of the liquid crystal layer 20g is determined by the drive electrodes 20e. Thereby, an image is formed.

The drive control portion 20f controls the drive electrodes 20e in such a manner that an image is formed in accordance with instructions from the entirety control portion 20a.

The front panel 20h is a transparent film or glass plate that covers the front surface of the electronic paper 2.

The operational button 20i is used for a user to give a command to the electronic paper 2. In particular, the operational button 20i includes a "next" button and a "back" button that are used to give a command to advance or turn back the page to be displayed, as described later.

The RFID 20j is a circuit called an Integrated Circuit (IC) tag or a wireless tag. The RFID 20j stores, therein, a unique identifier. The identifier is used for distinguishing the subject electronic paper 2 from another electronic paper. In view of this, the identifier is hereinafter referred to as an "electronic paper identifier 71".

In this embodiment, liquid crystal-type electronic paper is used as the electronic paper 2. Instead, however, other types of electronic paper, such as microcapsule-type electronic paper or electrophoresis-type electronic paper may be used as the electronic paper 2.

Referring back to FIG. 1, the document server 3 manages image data of each document on a file-by-file basis. Individual users can access the document server 3 and use image data of a desired document. Stated differently, the document server 3 enables the central management of image data of documents commonly used by a plurality of users. A so-called file server is used as the document server 3.

The terminal 4 is a so-called personal computer. The terminal 4 installs, thereon, applications such as word processing software, drawing software, and a web browser. The terminal 4 further installs, thereon, a driver for causing the image forming apparatus 1 to perform a process for printing a document image. A user uses such applications to create or obtain image data of a document. The user also uses the driver to cause the image forming apparatus 1 to perform a process for printing the document image onto paper or the electronic paper 2.

Figure 5:
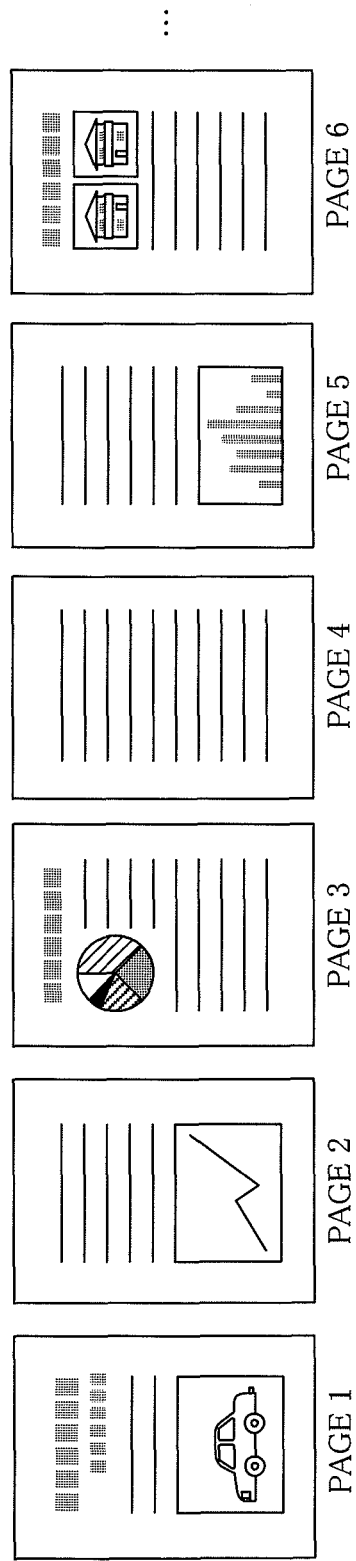
FIG. 5 is a diagram illustrating an example of the structure of images depicted on the individual pages of a document.

FIG. 5 is a diagram illustrating an example of the structure of images depicted on the individual pages of a document DCM. The following is a description of processes performed by the individual portions of the image forming apparatus 1 shown in FIG. 3.

The user information database 131 stores, therein, for each user, a set of a user ID and a password.

The box management portion 132 performs a process for managing boxes. To be specific, the box management portion 132 allocates, in advance, storage areas called "boxes" to individual users. Each of the users can save image data to a user's own storage area. The box management portion 132 saves new image data to a box or reads out the existing image data from a box in accordance with instructions given by a user.

A user is required to log onto the image forming apparatus 1 before starting to use the same.

The user management portion 101 performs a process for user management such as a log-on process on a user who intends to log onto the image forming apparatus 1. The log-on process is performed in the following manner.

When the user operates the touchscreen 10e or the like to enter his/her user ID and password, the user management portion 101 compares the user ID and password thus entered with each set of a user ID and a password stored in the user information database 131. If a match is found between the entered user ID and password and any one set of a user ID and a password stored in the user information database 131, then the user management portion 101 allows the user to log onto the image forming apparatus 1. This enables the user to use the image forming apparatus 1 within the authority granted to him/her.

The touchscreen operation management portion 102 serves to detect operation performed on the touchscreen 10e by the user, or display a screen on the touchscreen 10e. The touchscreen operation management portion 102 also performs the processes described above, i.e., the process for detecting that a user ID and a password are entered, or the process for displaying a screen for the user to enter his/user ID and password. In addition, the touchscreen operation management portion 102 serves to detect that operation for giving a command and instructions to print a document image on the electronic paper 2 is performed, and display a screen therefor, which will be described in order below.

The document data obtaining portion 103 performs a process for obtaining image data of a document image to be printed on the electronic paper 2. How to obtain the image data depends on the type of a job, as discussed below.

If a user specifies image data saved in a box and gives a command to print a document image on the electronic paper 2, then the document data obtaining portion 103 requests the box management portion 132 to read out the image data specified by the user, so that the image data is obtained.

Alternatively, if a user specifies image data saved in the document server 3 and gives a command to print a document image on the electronic paper 2, then the document data obtaining portion 103 downloads the image data specified by the user from the document server 3, so that the image data is obtained.

Alternatively, if a user gives a command to print, on the electronic paper 2, a document image depicted on paper, then the document data obtaining portion 103 causes the scanner 10g to perform a process for scanning the document image depicted on paper and creating image data thereof, so that the image data is obtained.

Yet alternatively, if a user operates the terminal 4 to give a command to perform PC printing, then the document data obtaining portion 103 obtains, as image data, print data transmitted by the terminal 4 together with the command.

The electronic paper state detection portion 104 detects a state of the electronic paper 2 placed on the paper output tray 10ft. A method for detecting the state will be described in order.

The print data generation portion 105 generates print data used for printing (displaying) a document image on the electronic paper 2 based on the state of the electronic paper 2 detected by the electronic paper state detection portion 104. A method for generating the print data will be described in order.

The print data transmission portion 106 sends print data generated by the print data generation portion 105 to the electronic paper 2.

The electronic paper power control portion 107 transmits a so-called magic packet; thereby to turn the power of the electronic paper 2 from OFF to ON. Alternatively, the electronic paper power control portion 107 turns the power from OFF to ON by transmitting a specific radio wave to the electronic paper 2.

Descriptions are given below of a method for detecting the state of the electronic paper 2 and a method for creating image data depending on the detected state. It is assumed that this embodiment describes a case of a document DCM having a plurality of pages each of which has the long side extending along the up-down direction as shown in FIG. 5.

[Paper Arrangement and Power State]

FIGS. 6A-8B are diagrams illustrating examples of how to arrange electronic paper 2.

When intending to print a document image of a document DCM on the electronic paper 2, a user places the electronic paper 2 on the paper output tray 10ft in the following way.

Figure 6A:
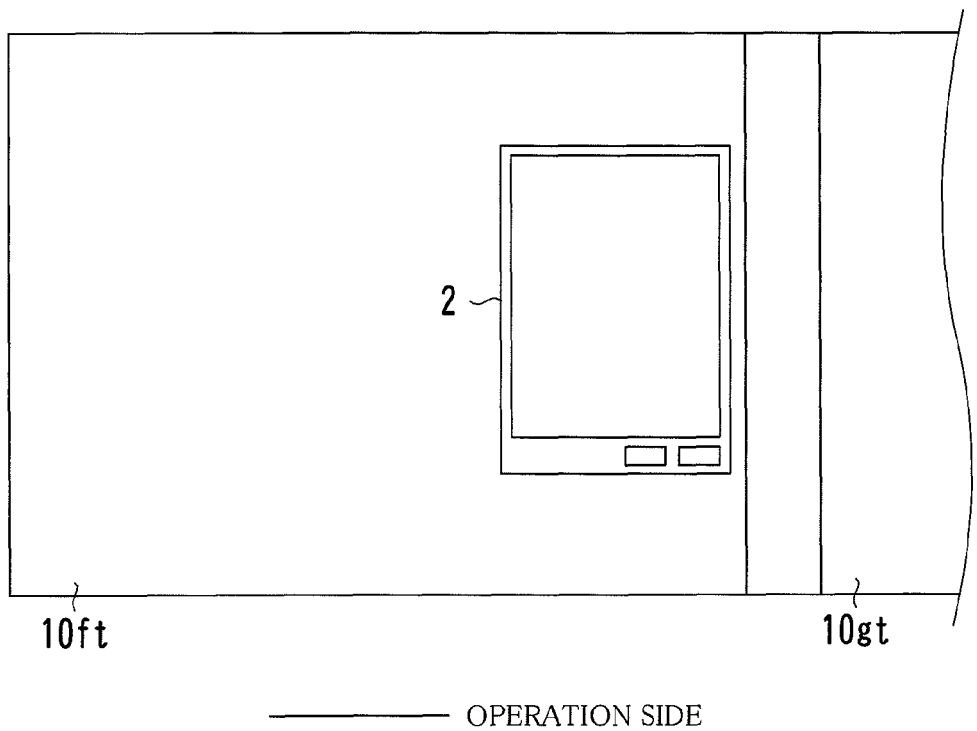
FIGS. 6A and 6B are diagrams illustrating an example of how to arrange electronic paper.

As shown in FIG. 6A, the user can place one piece of electronic paper 2 on the paper output tray 10ft in such a manner that the long side of the electronic paper 2 is parallel with the side perpendicular to the operation side of the image forming apparatus 1, and at the same time, that the front surface of the electronic paper 2 faces upward.

Figure 6B:
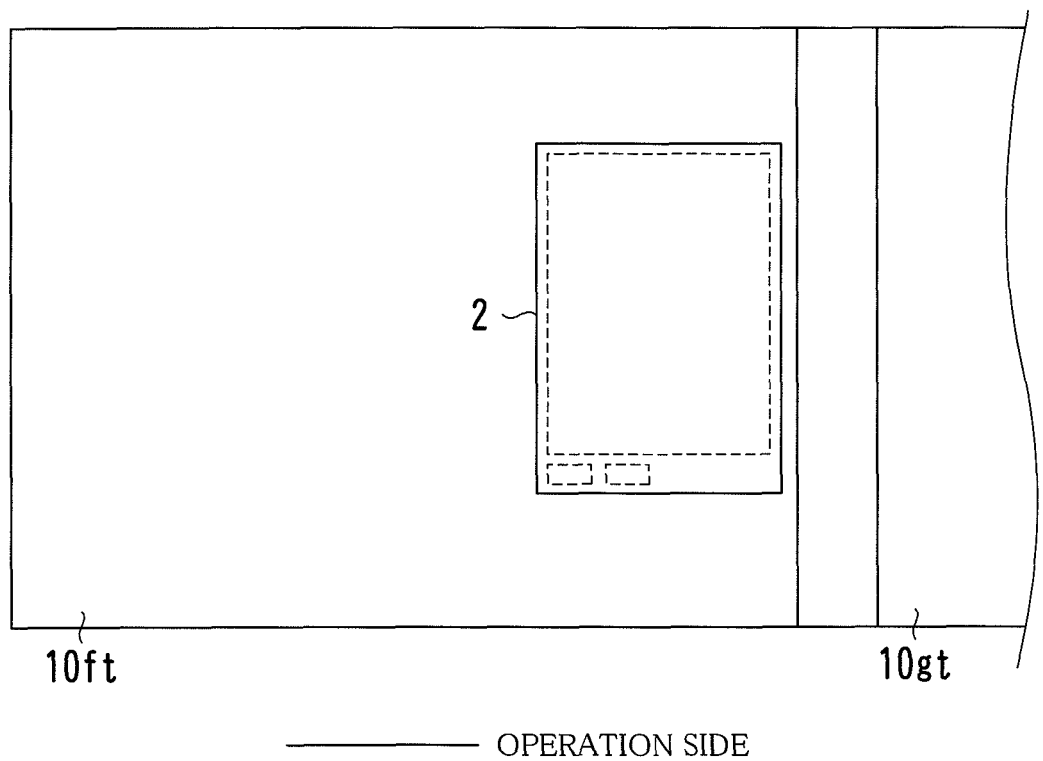

Alternatively, as shown in FIG. 6B, the user can place one piece of electronic paper 2 on the paper output tray 10ft in such a manner that the long side of the electronic paper 2 is parallel with the side perpendicular to the operation side of the image forming apparatus 1, and at the same time, that the rear surface of the electronic paper 2 faces upward. Hereinafter, it is assumed that the electronic paper 2 is so placed that the front surface thereof faces upward unless otherwise specified.

Alternatively, as shown in FIG. 7A, the user can place one piece of electronic paper 2 on the paper output tray 10ft in such a manner that the short side of the electronic paper 2 is parallel with the side perpendicular to the operation side of the image forming apparatus 1.

Alternatively, as shown in FIG. 7B, the user can place a plurality of pieces of electronic paper 2 on the paper output tray 10ft in such a manner that the long sides of the plurality pieces of electronic paper 2 are parallel with the side perpendicular to the operation side of the image forming apparatus 1, and at the same time, that the lower sides thereof are aligned with one another. Hereinafter, the plurality of pieces of electronic paper 2 are sometimes distinguished from one another as "electronic paper 2A", "electronic paper 2B", "electronic paper 2C", . . . , and so on in order from the left as viewed from the operation side of the image forming apparatus 1.

Alternatively, as shown in FIG. 8A, the user can place a plurality of pieces of electronic paper 2 on the paper output tray 10ft in such a manner that the short sides of the plurality of pieces of electronic paper 2 are parallel with the side perpendicular to the operation side of the image forming apparatus 1, and at the same time, that the short sides thereof are aligned with one another. Hereinafter, the plurality of pieces of electronic paper 2 are sometimes distinguished from one another as "electronic paper 21", "electronic paper 22", . . . , and so on in order from the side opposite to the operation side of the image forming apparatus 1.

Alternatively, as shown in FIG. 8B, the user can place a plurality of pieces of electronic paper 2 on the paper output tray 10ft in such a manner that the short sides of the plurality of pieces of electronic paper 2 are parallel with the side perpendicular to the operation side of the image forming apparatus 1, and at the same time, that the plurality of pieces of electronic paper 2 are arranged so as to form a matrix. Hereinafter, the plurality of pieces of electronic paper 2 are sometimes distinguished from one another as "electronic paper 21A", "electronic paper 21B", "electronic paper 22A", "electronic paper 22B" . . . , and so on by adding subscripts "1", "2", . . . , and so on to the reference numbers of the plurality of pieces of electronic paper 2 in order from the side opposite to the operation side of the image forming apparatus 1, and by adding subscripts "A", "B", . . . , and so on to the reference numbers of the plurality of pieces of electronic paper 2 in order from the left as viewed from the operation side of the image forming apparatus 1.

The user arranges the electronic paper 2 in any of the ways described above with reference to FIGS. 6A-8B depending on a desired print (display) format. In principle, the user arranges the electronic paper 2 with the power thereof turned ON. However, the user sometimes arranges the electronic paper 2 with the power thereof turned OFF depending on a desired print format. Descriptions are given below as to how to detect the state of the electronic paper 2 by the individual portions of the image forming apparatus 1, and as to how to print a document image depending on the detected state by the individual portions of the image forming apparatus 1.

[Detection of State of Electronic Paper 2]

As described above, the electronic paper state detection portion 104 detects the state of the electronic paper 2. Check items to determine the state of the electronic paper 2 include: (1) the quantity of electronic paper 2 placed on the paper output tray 10*ft*; (2) which side of the electronic paper 2 is parallel with the side perpendicular to the operation side of the image forming apparatus 1; (3) positional relationship of the plurality of pieces of electronic paper 2 relative to one another; (4) whether the power of the electronic paper 2 is turned ON or OFF; and (5) whether the front surface of the electronic paper 2 faces upward or downward.

The electronic paper state detection portion 104 can detect (1), (2), and (5) based on an image included in photograph data 7S obtained from the digital camera 1DR.

However, as long as the appearance of the plurality of pieces of electronic paper 2 is identical with one another, the electronic paper state detection portion 104 cannot detect (3) based on the photograph data 7S. To cope with this, the electronic paper state detection portion 104 detects (3) by causing the RFID reader/writer 10*j* to measure the distance between the RFID reader/writer 10*j* and each piece of the electronic paper 2. The RFID reader/writer 10*j* transmits predetermined signals, and reads out an electronic paper identifier 71 of each piece of the electronic paper 2. At this time, the RFID reader/writer 10*j* measures the intensity of a signal, transmitted from each piece of the electronic paper 2, indicating the electronic paper identifier 71. The electronic paper state detection portion 104, then, locates each piece of the electronic paper 2 based on the relationship, which is specified in advance, between the intensity of a signal and a distance. In this way, the electronic paper state detection portion 104 can detect (3) described above.

In order to detect (3) more reliably, another configuration is possible in which a plurality of RFID readers 10*j* are provided at different positions, and a triangulation method is employed.

Alternatively, an electronic paper identifier 71 may be printed on the front casing and the rear casing of each piece of the electronic paper 2. Yet alternatively, an electronic paper identifier 71 may be displayed on each piece of the electronic paper 2. Then, the digital camera 1DR is used to capture an image of such electronic paper 2; thereby to make a detection of (3).

The electronic paper state detection portion 104 detects (4) as follows. The electronic paper state detection portion 104 transmits a specific command such as a ping command to an IP address of each piece of the electronic paper 2. If electronic paper 2 sends a response to the specific command, then the electronic paper state detection portion 104 determines that the power of such electronic paper 2 is turned ON. In contrast, if electronic paper 2 does not send a response to the specific command even after a predetermined lapse of time, then the electronic paper state detection portion 104 determines that the power of such electronic paper 2 is turned OFF.

[Creation and Transmission of Print Data Depending on the State of Electronic Paper 2]

The print data generation portion 105 generates print data 72 used for printing a document image of a document DCM on the electronic paper 2 in the following manner depending on a state of the electronic paper 2 detected by the electronic paper state detection portion 104. Examples of the format of the print data 72 are Portable Document Format (PDF) and Tagged Image File Format (TIFF) in which a plurality of pages can be aggregated into one file.

The print data transmission portion 106 sends the print data 72 generated by the print data generation portion 105 to the electronic paper 2. The print data 72 is stored in the memory 20*d* of the electronic paper 2.

[Case 1]

Figure 9A:
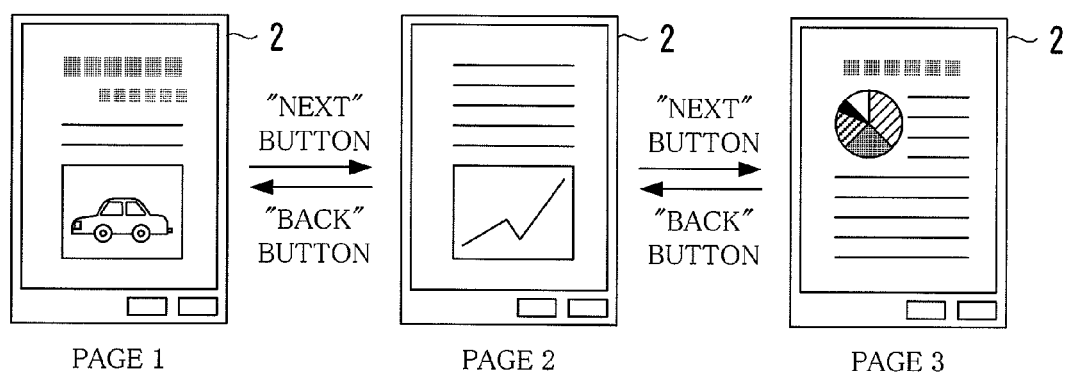
FIGS. 9A and 9B are diagrams illustrating an example of how to display images on electronic paper.
Figure 9B:
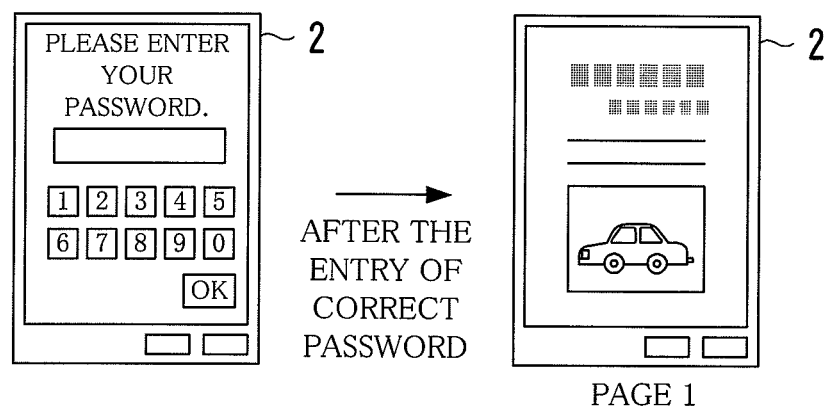

FIGS. 9A and 9B are diagrams illustrating examples of how to display images on electronic paper 2.

In the case where the state as shown in FIG. 6A is detected, i.e., where one piece of electronic paper 2 is detected, and at the same time, where it is detected that the long side of the electronic paper 2 is parallel with the side perpendicular to the operation side of the image forming apparatus 1, the print data generation portion 105 generates, as the print data 72, print data 72A for displaying document images of a document DCM on a page-by-page basis on the entire display surface of the electronic paper 2 as shown in FIG. 9A.

The print data transmission portion 106 sends the print data 72A generated to the electronic paper 2.

The electronic paper 2 displays, thereon, Page 1 of the document DCM as the first page based on the received print data 72A. Every time the "next" button is pressed, the electronic paper 2 sequentially displays, thereon, Page 2, Page 3, . . . , and so on of the document DCM.

[Case 2]

In the case where the state as shown in FIG. 6B is detected, i.e., where one piece of electronic paper 2 is detected, and at the same time, where it is detected that the long side of the electronic paper 2 is parallel with the side perpendicular to the operation side of the image forming apparatus 1, and it is detected that the rear surface of the electronic paper 2 faces up, the print data generation portion 105 generates print data 72A, as with Case 1, for displaying document images of a document DCM on a page-by-page basis on the entire display surface of the electronic paper 2 as shown in FIG. 9A. Note that, in Case 2, the print data 72A is encrypted based on the common key cryptosystem by using the password of the user logging onto the image forming apparatus 1. Hereinafter, the print data 72A that has been subjected to the encryption process is referred to as "encrypted print data 72B".

According to the encrypted print data 72B, the electronic paper 2 requests the user to enter his/her password as shown in FIG. 9B before displaying document images of a document DCM. The encrypted print data 72B is decrypted by using the password entered by the user, and thereby, the encrypted print data 72B is changed to plain data, i.e., print data 72A. After that, the electronic paper 2 displays, thereon, Page 1 of the document DCM. Thereafter, as with Case 1, the electronic paper 2 displays, thereon, the individual pages in accordance with operation performed by the user as shown in FIG. 9A.

[Modification of Case 1 and Case 2]

Another configuration may be provided. To be specific, in the case where the electronic paper 2 has already stored, therein, print data of another document DCM', a user determines, in accordance with whether the front surface of the electronic paper 2 faces upward or downward, whether to delete print data 72' that is print data 72 of the document DCM' from the memory 20*d* and to newly store a document DCM in the memory 20*d*, or, to add the document DCM to the document DCM' already stored.

In the case where the state as shown in FIG. 6A is detected, i.e., where it is detected that the front surface of the electronic paper 2 faces upward, the print data generation portion 105 generates print data 72 in the following manner.

The print data generation portion 105 obtains, from the electronic paper 2, print data 72' that is print data 72 of a document DCM' currently stored in the memory 20*d* of the electronic paper 2. The print data generation portion 105, then, creates print data 72C by adding data to the print data 72' in such a manner that the top page of the document DCM follows the last page of the document DCM'. Alternatively, it is possible for the print data generation portion 105 to generate print data of the document DCM separately from the document DCM'. In such a case, link information to the document DCM' is added to the print data of the document DCM, and link information to the document DCM is added to the print data 72' of the document DCM', so that both the documents DCM and DCM' are displayed in succession.

The print data transmission portion 106 gives a command to delete the print data 72' to the electronic paper 2, and sends the print data 72C to the electronic paper 2.

On the other hand, in the case where the state as shown in FIG. 6B is detected, i.e., where it is detected that the front surface of the electronic paper 2 faces downward, the print data generation portion 105 generates print data 72A in a manner similar to Case 1. Note, however, that the electronic paper 2 is instructed to delete the print data 72' from the memory 20*d* thereof before the print data 72A is received. After the print data 72' is deleted, the print data transmission portion 106 sends the print data 72A and the print data 72A is stored into the memory 20*d*.

The modification of Case 1 and Case 2 is similar to Case 1 and Case 2 in that the electronic paper 2 displays, thereon, individual pages of a document in accordance with operation performed by a user based on the print data 72A or 72C newly stored in the memory 20*d*.

Another configuration is possible in which a user can determine whether or not to perform the encryption process, or, whether or not to add another document to the existing document, in accordance with whether the front surface of the electronic paper 2 faces upward or downward.

[Case 3 and Case 4]

According to the modification of Case 1 and Case 2, the determination is made as to whether or not a new document DCM is added to another document DCM' already stored in the electronic paper 2 based on whether the front surface of the electronic paper 2 faces upward or downward, Instead, however, such a determination may be made in accordance with the power state of the electronic paper 2 in the following manner.

In the case where it is detected that the power of the electronic paper 2 is turned ON, the print data generation portion 105 obtains the print data 72' of the document DCM' from the electronic paper 2. The print data generation portion 105, then, creates print data 72C by adding data to the print data 72' in such a manner that the top page of the document DCM follows the last page of the document DCM'. This case is hereinafter referred to as "Case 3".

On the other hand, in the case where it is detected that the power of the electronic paper 2 is turned OFF, the print data generation portion 105 generates print data 72A in a manner similar to Case 1. Note, however, that the electronic paper 2 is instructed to delete the print data 72' from the memory 20*d* thereof before the print data 72A is received. After the print data 72' is deleted, the print data transmission portion 106 sends the print data 72A and the print data 72A is stored into the memory 20*d*. This case is hereinafter referred to as "Case 4".

[Case 5]

Figure 10:
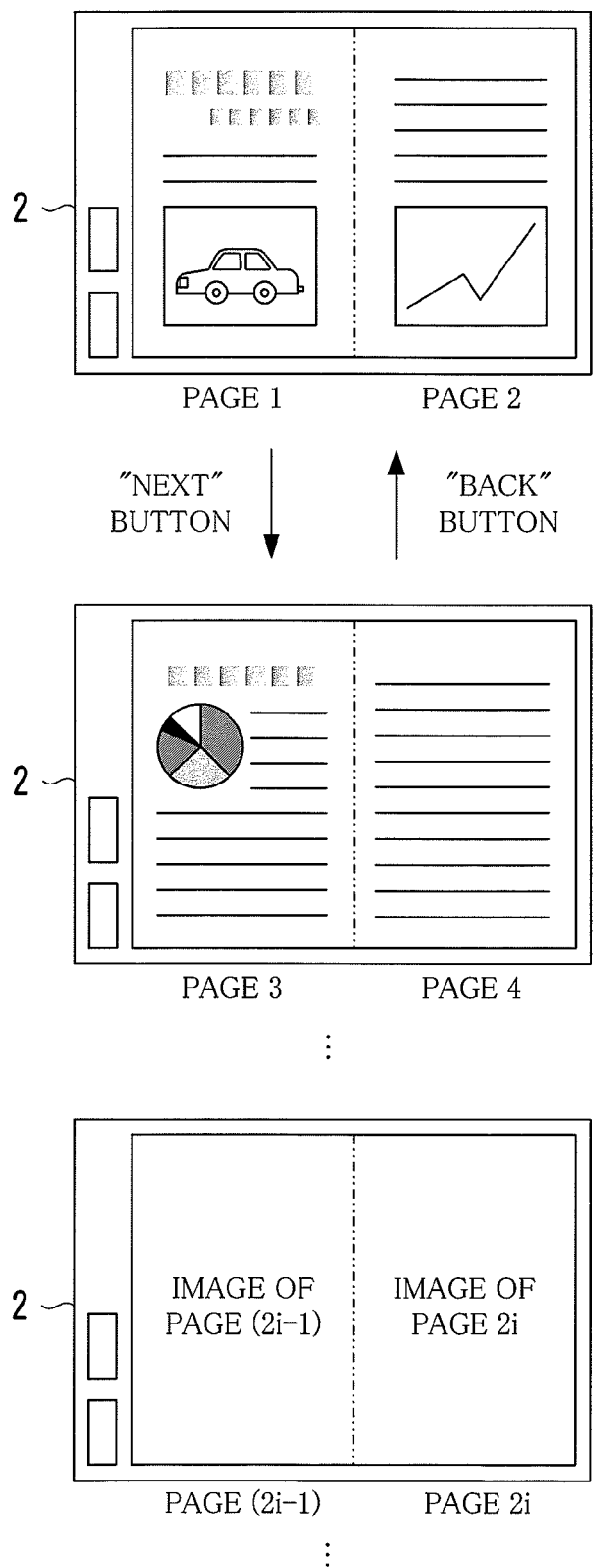
FIG. 10 is a diagram illustrating an example of how to display images on electronic paper.

FIG. 10 is a diagram illustrating an example of how to display images on electronic paper 2.

In the case where the state as shown in FIG. 7A is detected, i.e., where one piece of electronic paper 2 is detected, and at the same time, where it is detected that the short side of the electronic paper 2 is parallel with the side perpendicular to the operation side of the image forming apparatus 1, the print data generation portion 105 generates, as the print data 72, print data 72D for displaying document images corresponding to two pages of a document DCM on the entire display surface of the electronic paper 2 as shown in FIG. 10. In short, the print data generation portion 105 generates the print data 72D for displaying images in the form called 2-in-1 printing, 2-up printing, or the like.

The print data transmission portion 106 sends the print data 72D generated to the electronic paper 2.

The electronic paper 2 displays, thereon, Page 1 and Page 2 of the document DCM as the first page based on the received print data 72D. Every time the "next" button is pressed, the electronic paper 2 displays, thereon, document images corresponding to the next two pages of the document DCM at one time.

[Case 6]

Figure 11:
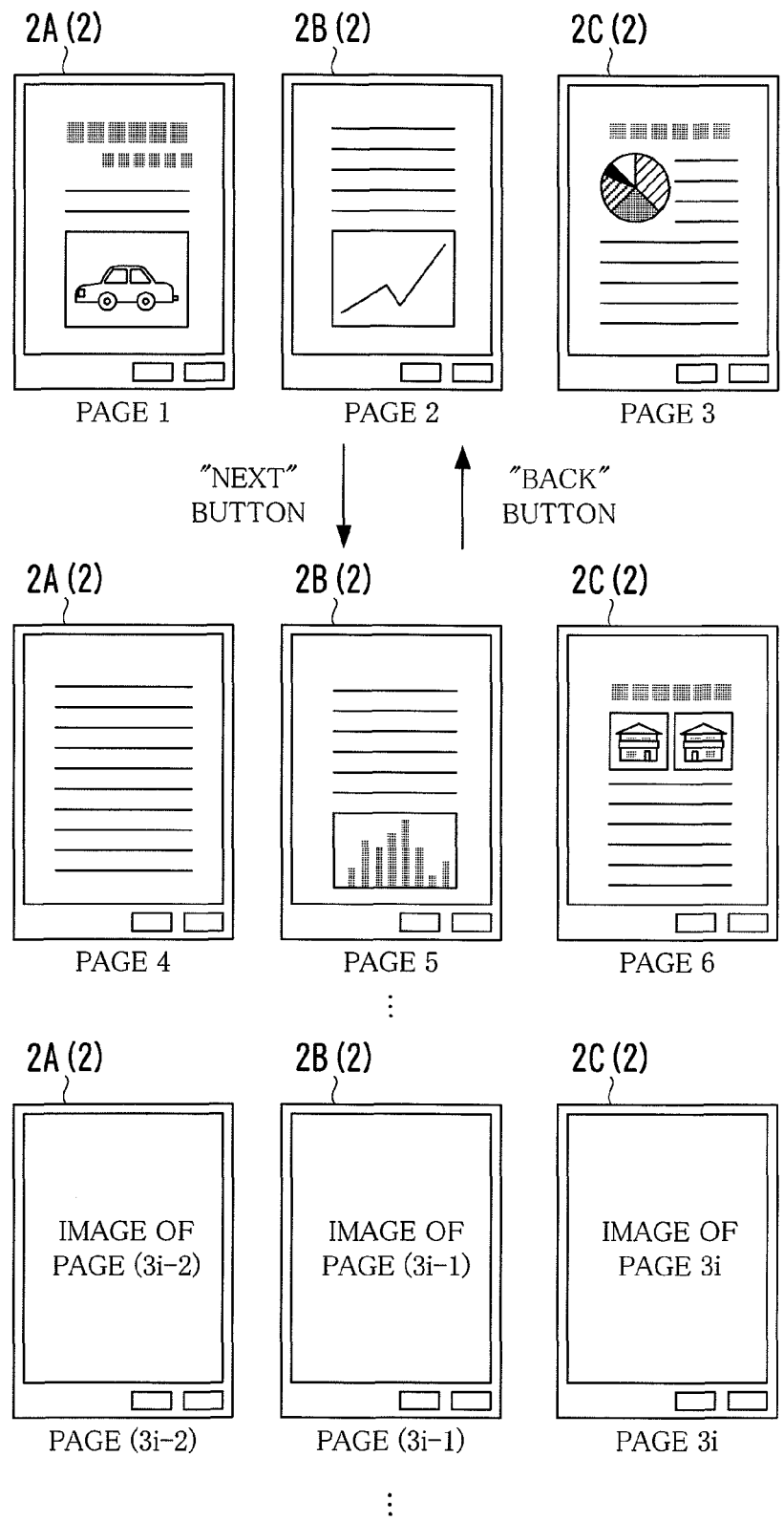
FIG. 11 is a diagram illustrating an example of how to display images on electronic paper.

FIG. 11 is a diagram illustrating an example of how to display images on electronic paper 2.

In the case where the state as shown in FIG. 7B is detected, i.e., where three pieces of electronic paper 2 (2A, 2B, and 2C) are detected, and at the same time, where it is detected that the long sides of the electronic paper 2A, 2B, and 2C are parallel with the side perpendicular to the operation side of the image forming apparatus 1, and it is detected that the lower sides of the electronic paper 2A, 2B, and 2C are aligned with one another, the print data generation portion 105 generates, as the print data 72, three pieces of print data 72E (72EA, 72EB, and 72EC).

Referring to FIG. 11, the print data 72EA is print data 72 for displaying a document image of Page ($3i$-2) of a document DCM on a page-by-page basis. Here, "i" denotes a counting number. The print data 72EB is print data 72 for displaying a document image of Page ($3i$-1) of the document DCM on a page-by-page basis. The print data 72EC is print data 72 for displaying a document image of Page $3i$ of the document DCM on a page-by-page basis.

The print data transmission portion 106 sends the print data 72EA, the print data 72EB, and the print data 72EC, respectively, to the electronic paper 2A, the electronic paper 2B, and the electronic paper 2C.

The electronic paper 2A, 2B, and 2C display, thereon, document images respectively of Page 1, Page 2, and Page 3 of the document DCM as the first page based on the print data 72EA, 72EB, and 72EC, respectively. Every time the "next" button is pressed, each piece of the electronic paper 2A, 2B, and 2C displays, thereon, a document image corresponding to the third page from the current page. Alternatively, the following configuration may be provided. To be specific, the electronic paper 2A, 2B, and 2C work in coordination with one another. If the "next" button of any of the electronic paper 2A, 2B, and 2C is pressed, then all the electronic paper 2A, 2B, and 2C display, thereon, document images corresponding to the third page from the current page synchronously with one another. The same applies to a case described later in which a plurality of pieces of electronic paper 2 is used. To be specific, if the "next" button is pressed in any of a plurality of pieces of electronic paper 2, pages can be advanced in displays of the plurality of pieces of electronic paper 2.

Case 6 describes the case in which three pieces of electronic paper 2 are used. The same process as that of Case 6 is applied to a case where a plurality of pieces of electronic paper 2 other than three are used.

In the case where, for example, two pieces of electronic paper 2A and 2B are used, two pieces of print data 72E are created. One of the two pieces of print data 72E is data for displaying a document image of Page (2$i$-1) of a document DCM on a page-by-page basis. The other is print data 72 for displaying a document image of Page 2$i$ of the document DCM on a page-by-page basis.

In other words, when j (j≥2) pieces of electronic paper 2 are used, j pieces of print data 72E are created. In such a case, the x-th (1≤x≤j) print data 72E is data for displaying document images of Page (ji–(j–x)) of a document DCM on a page-by-page basis. Stated differently, the x-th (1≤x≤j) print data 72E is data for displaying document images of one or more pages. The page numbers of such pages are integers that leave a remainder of x when divided by j.

[Modification of Case 6]

Figure 12:
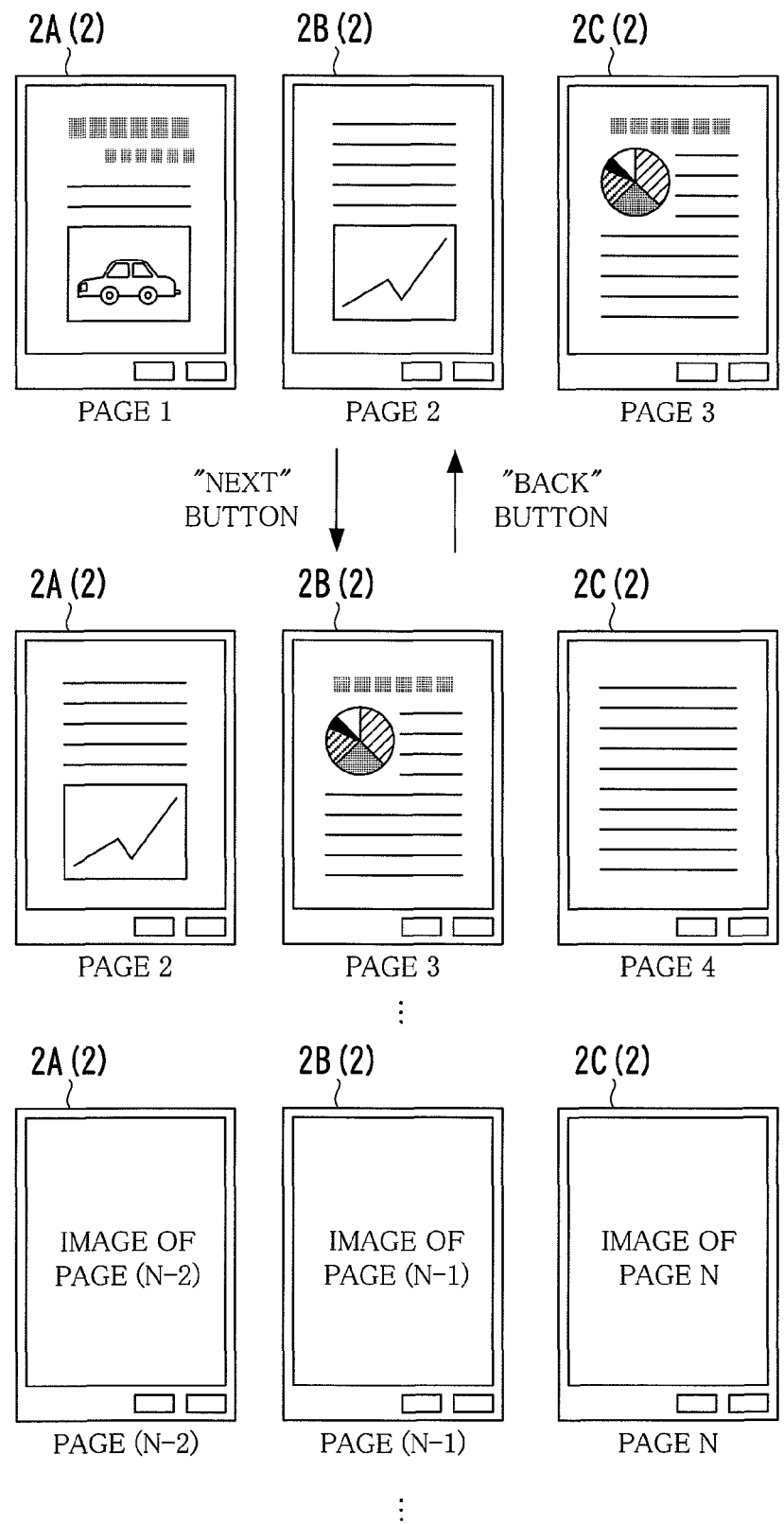
FIG. 12 is a diagram illustrating an example of how to display images on electronic paper.

FIG. 12 is a diagram illustrating an example of how to display images on electronic paper 2.

In the case where the state as shown in FIG. 7B is detected, the print data generation portion 105 generates print data 72FA, 72FB, and 72FC, respectively, as the print data 72 for the electronic paper 2A, 2B, and 2C.

Referring to FIG. 12, the print data 72FA is print data 72 for displaying document images of Page 1 through Page (N–2) of a document DCM on a page-by-page basis. Here, "N" denotes the total number of pages of the document DCM, and is a multiple of 3 in this example. The print data 72FB is print data 72 for displaying document images of Page 2 through Page (N–1) on a page-by-page basis. The print data 72FC is print data 72 for displaying document images of Page 3 through Page N on a page-by-page basis.

The electronic paper 2A, 2B, and 2C display, thereon, document images respectively of Page 1, Page 2, and Page 3 of the document DCM as the first page based on the print data 72FA, 72FB, and 72FC, respectively. Every time the "next" button is pressed, each piece of the electronic paper 2A, 2B, and 2C displays, thereon, a document image DCM corresponding to the next page. This configuration allows a user to see the indication on the electronic paper 2 in such a manner that page images are shifted from the right to the left of the electronic paper 2 in response to the "next" button pressed.

The modification of Case 6 describes the case in which three pieces of electronic paper 2 are used. The same process as that of the modification of Case 6 is applied to a case where a plurality of pieces of electronic paper 2 other than three are used.

In the case where, for example, two pieces of electronic paper 2A and 2B are used, two pieces of print data 72F are created. One of the two pieces of print data 72F is data for displaying document images of Page 1 through Page (N–1) of a document DCM on a page-by-page basis. The other is data for displaying document images of Page 2 through Page N of the document DCM on a page-by-page basis.

In other words, when j (j≥2) pieces of electronic paper 2 are used, j pieces of print data 72F are created. In such a case, the x-th (1≤x≤j) print data 72F is data for displaying document images of Page x through Page (N–(j–x)) of a document DCM on a page-by-page basis.

[Case 7]

Figure 13:
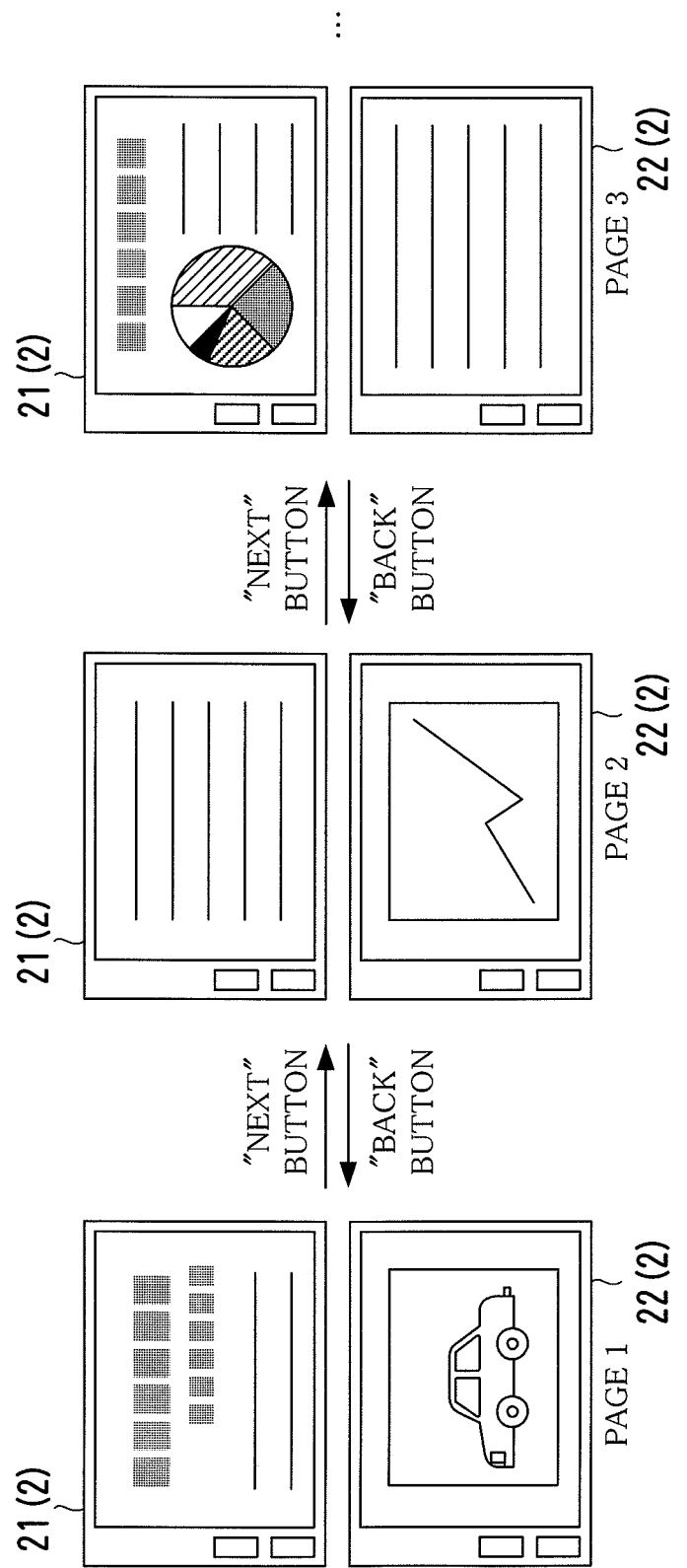
FIG. 13 is a diagram illustrating an example of how to display images on electronic paper.

FIG. 13 is a diagram illustrating an example of how to display images on electronic paper 2.

In the case where the state as shown in FIG. 8A is detected, i.e., where two pieces of electronic paper 21 and 22 are detected, and at the same time, where it is detected that the short sides of the electronic paper 21 and 22 are parallel with the side perpendicular to the operation side of the image forming apparatus 1, and it is detected that the short sides thereof are aligned with each other, the print data generation portion 105 generates print data 72GA and 72GB, respectively, as the print data 72 for the electronic paper 21 and 22.

Referring to FIG. 13, the print data 72GA is print data 72 for displaying document images of the upper halves of the individual pages of a document DCM. The print data 72GB is print data 72 for displaying document images of the lower halves of the individual pages of the document DCM.

The print data transmission portion 106 sends the print data 72GA and the print data 72GB, respectively, to the electronic paper 21 and the electronic paper 22.

The electronic paper 21 and 22 display, as the first page, document images of the upper half and the lower half of Page 1 of the document DCM based on the print data 72GA and 72GB, respectively. Every time the "next" button is pressed, the electronic paper 21 and 22 display document images of the upper half and the lower half of the next page of the document DCM, respectively.

Case 7 describes the case in which two pieces of electronic paper 2 are used. The same process as that of Case 7 is applied to a case where three or more pieces of electronic paper 2 are used.

In the case where, for example, k (k≥2) pieces of electronic paper 2 are used, k pieces of print data 72G are created. The y-th (1≤y≤k) print data 72G is data for displaying a document image corresponding to the y-th area from the top of k areas that are obtained by division of each page.

[Case 8]

Figure 14:
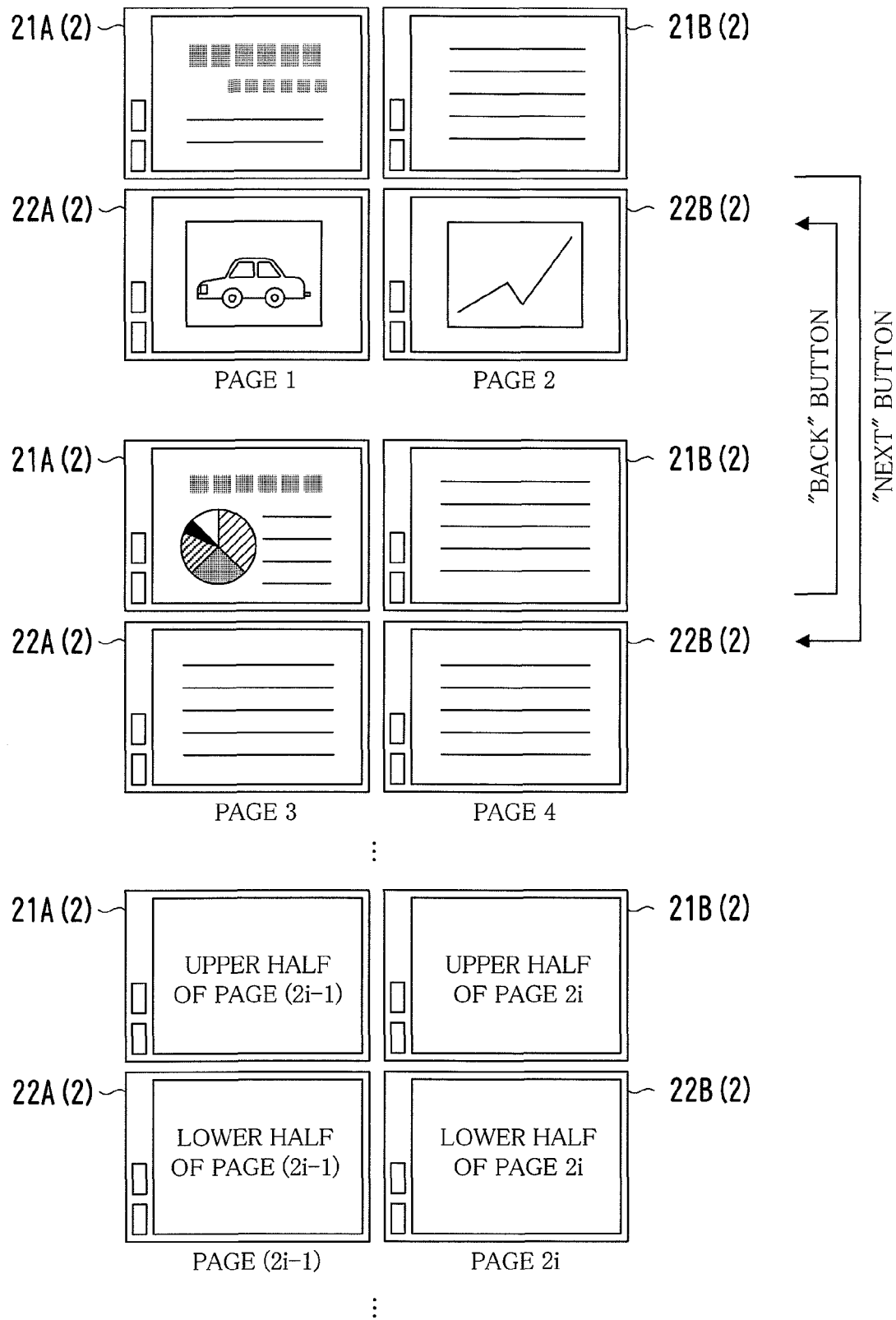
FIG. 14 is a diagram illustrating an example of how to display images on electronic paper.
Figure 15:
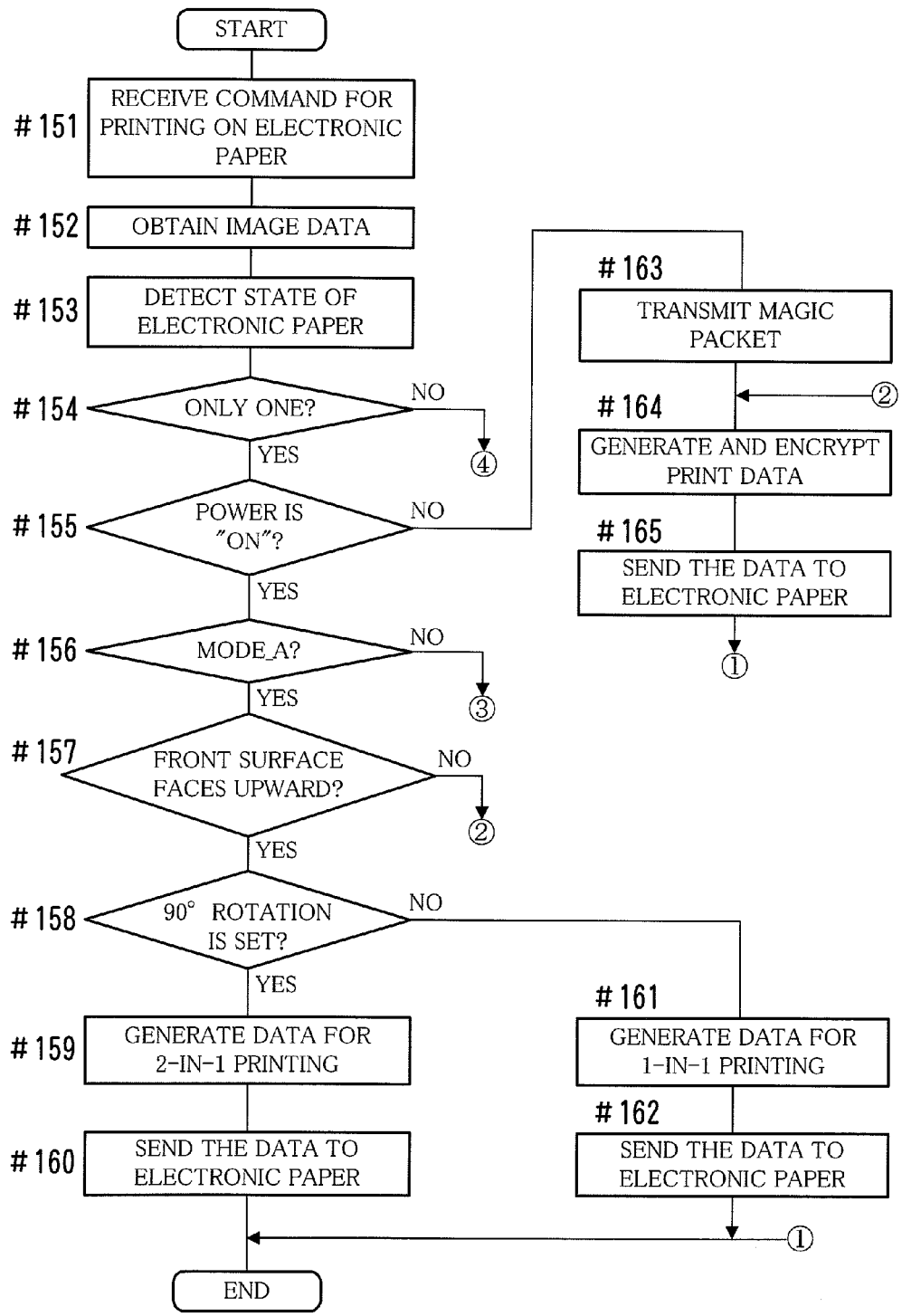
FIG. 15 is a flowchart depicting an example of the overall processing flow of an image forming apparatus.
Figure 16:
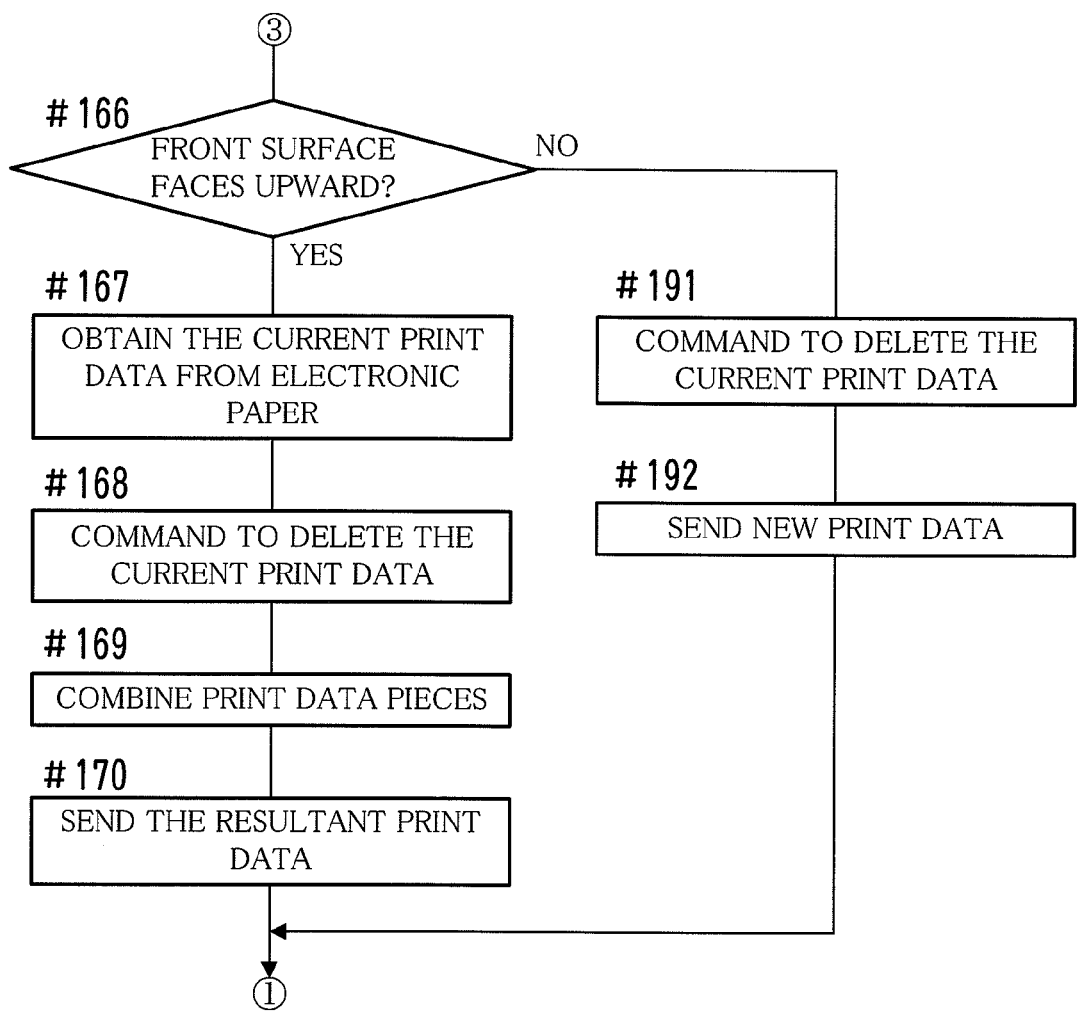
FIG. 16 is a flowchart depicting an example of the overall processing flow of an image forming apparatus.
Figure 17:
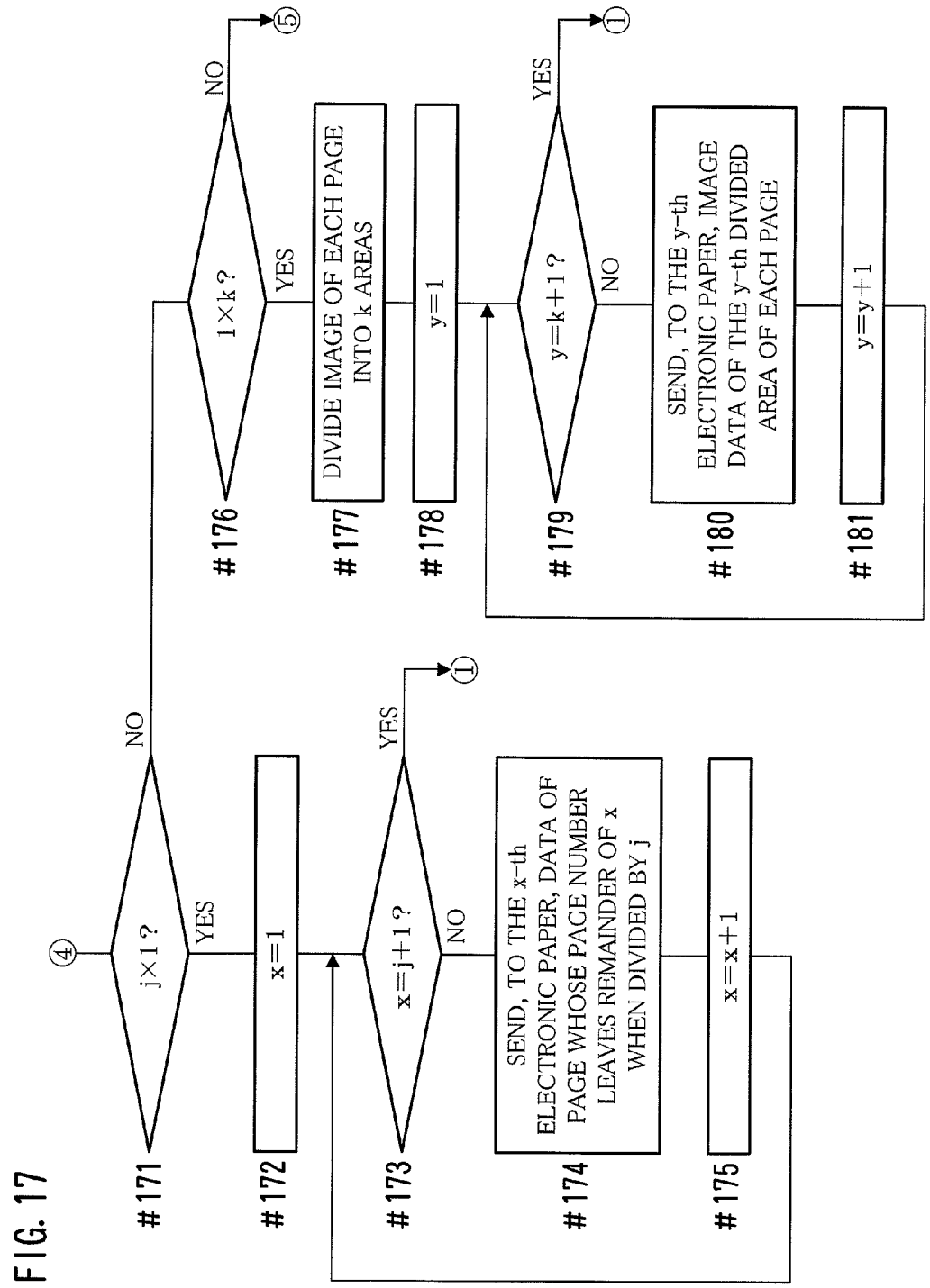
FIG. 17 is a diagram illustrating an example of the overall processing flow of an image forming apparatus.
Figure 18:
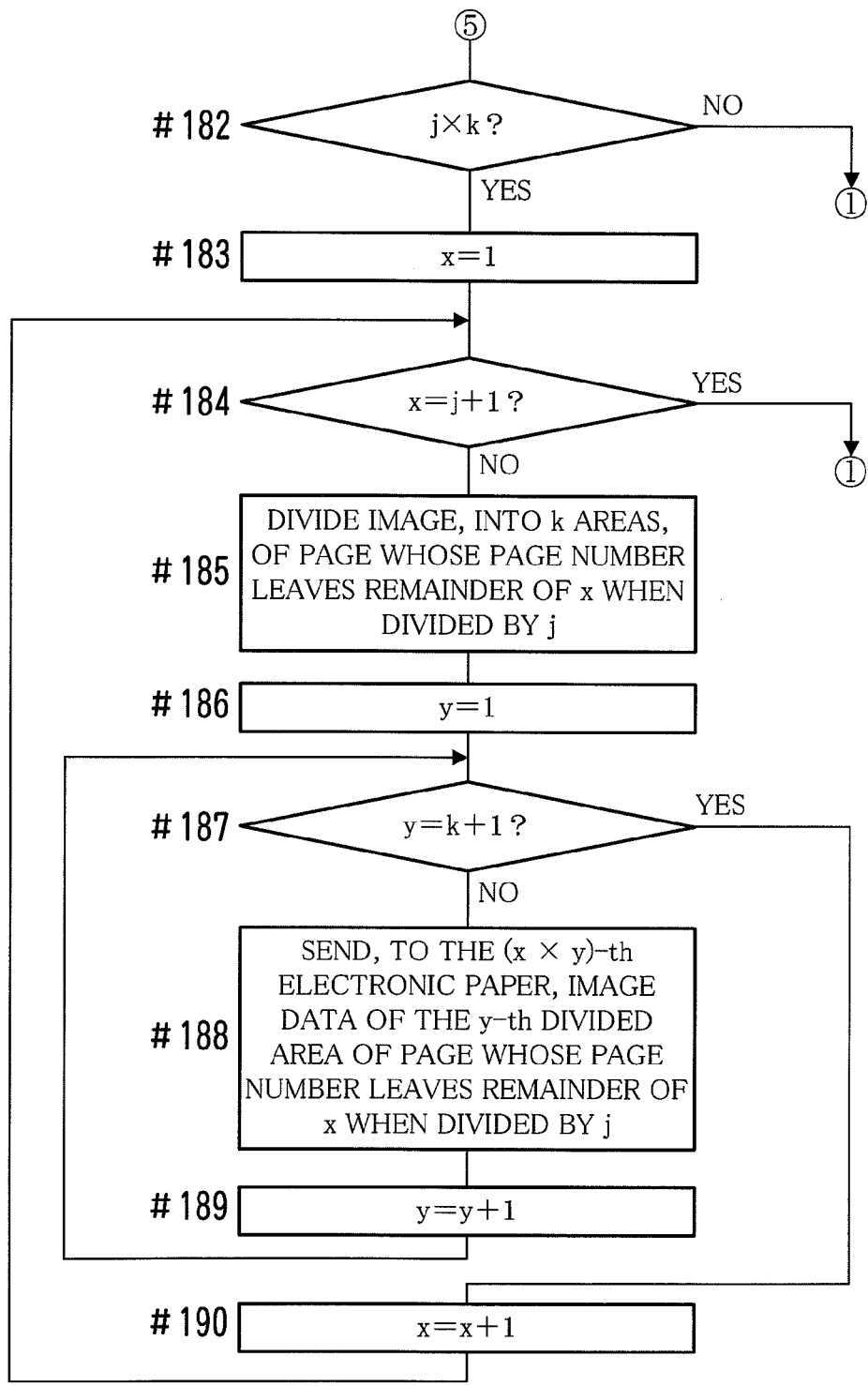
FIG. 18 is a diagram illustrating an example of the overall processing flow of an image forming apparatus.

FIG. 14 is a diagram illustrating an example of how to display images on electronic paper 2.

In the case where the state as shown in FIG. 8B is detected, i.e., where four pieces of electronic paper 2 are detected, and at the same time, where it is detected that the electronic paper 21A and 22A are arranged in order from the side opposite to the operation side of the image forming apparatus 1, and on the right side of the electronic paper 21A and 22A, the electronic paper 21B and 22B are arranged in order from the side opposite to the operation side of the image forming apparatus 1, the print data generation portion 105 generates, as the print data 72 for the electronic paper 21A, 22A, 21B, and 22B, print data 72HP, 72HQ, 72HR, and 72HS, respectively.

Referring to FIG. 14, the print data 72HP is print data 72 for displaying document images of the upper halves of odd-numbered pages of a document DCM. The print data 72HQ is print data 72 for displaying document images of the lower halves of odd-numbered pages of the document DCM. The print data 72HR is print data 72 for displaying document images of the upper halves of even-numbered pages of the document DCM. The print data 72HS is the print data 72 for displaying document images of the lower halves of even-numbered pages of the document DCM.

The print data transmission portion 106 sends the print data 72HP, the print data 72HQ, the print data 72HR, and the print data 72HS, respectively, to the electronic paper 21A, the electronic paper 22A, the electronic paper 21B, and the electronic paper 22B.

The electronic paper 21A, 22A, 21B, and 22B display, as the first page, document images of the upper half of Page 1 of the document DCM, the lower half thereof, the upper half of Page 2 of the document DCM, and the lower half thereof, based on the print data 72HP, 72HQ, 72HR, and 72HS, respectively. Every time the "next" button is pressed, each piece of the electronic paper 21A, 22A, 21B, and 22B displays a document image of the upper half or the lower half of the second page from the current page of the document DCM, respectively.

Case 8 describes the case in which 2×2 pieces of electronic paper 2 are used. The same process as that of Case 8 is applied to a case where a plurality of pieces of electronic paper 2 other than that of Case 8 are used.

In the case where j×k (j≥2, k≥2) pieces of electronic paper 2 are used, j×k pieces of print data 72H are created. The (x×y)-th (1≤x≤j, 1≤y≤k) print data 72H is data for displaying a document image corresponding to the y-th area from the top of k areas into which each of one or more pages is divided. The page numbers of such pages are integers that leave a remainder of x when divided by j.

FIGS. 15-18 are flowcharts depicting an example of the overall processing flow of the image forming apparatus 1.

The following is a description of the flow of processes performed by the image forming apparatus 1 on the electronic paper 2, with reference to the flowcharts of FIGS. 15-18.

Referring to FIGS. 15-18, when the image forming apparatus 1 receives a command to print a document image on electronic paper 2 and obtains image data thereof (#151 and #152), the image forming apparatus 1 detects the state of the electronic paper 2 placed on the paper output tray 10ft (#153). The image forming apparatus 1 performs the following processes depending on the detection result.

If the image forming apparatus 1 detects that only one piece of electronic paper 2 is placed, that the power of the electronic paper 2 is turned ON, and that the front surface of the electronic paper 2 faces upward, and further, if the image forming apparatus 1 enters a mode in which an encryption process is performed in accordance with whether the front surface of the electronic paper 2 faces upward or downward (Yes in #154, Yes in #155, Yes in #156, and Yes in #157), then the image forming apparatus 1 generates the following print data 72 depending on the state of the electronic paper 2, and sends the generated print data 72 to the electronic paper 2.

If detecting that the electronic paper 2 is placed as shown in FIG. 6A (No in #158), then the image forming apparatus 1 generates the print data 72A for displaying document images of a document DCM on a page-by-page basis on the entire display surface of the electronic paper 2 as shown in FIG. 9A, and sends the print data 72A to the electronic paper 2 (#161 and #162). In such a case, the image forming apparatus 1 does not encrypt the print data 72A. On the other hand, if detecting that the electronic paper 2 is placed as shown in FIG. 7A (Yes in #158), then the image forming apparatus 1 generates the print data 72D for displaying document images corresponding to two pages of a document DCM on the entire display surface of the electronic paper 2 as shown in FIG. 10, and sends the print data 72D to the electronic paper 2 (#159 and #160).

Alternatively, if the image forming apparatus 1 detects that only one piece of electronic paper 2 is placed, that the power of the electronic paper 2 is turned ON, and that the front surface of the electronic paper 2 faces downward, and further, if the image forming apparatus 1 enters a mode in which an encryption process is performed in accordance with whether the front surface of the electronic paper 2 faces upward or downward (Yes in #154, Yes in #155, Yes in #156, and No in #157), then the image forming apparatus 1 encrypts the print data 72A by using user's password; thereby to generate encrypted print data 72B, and sends the same to the electronic paper 2 (#164 and #165). In order to display document images of the document DCM on the electronic paper 2 by using the encrypted print data 72B, the user is required to enter his/her password to decrypt the encrypted print data 72B to obtain the print data 72A (see FIG. 9B)

If the image forming apparatus 1 enters a mode for addition of document image depending on whether the front surface of the electronic paper 2 faces up or down instead of the mode for the encryption process depending thereon (Yes in #154, Yes in #155, and No in #156), then the image forming apparatus 1 performs the following processes. If the image forming apparatus 1 detects that the front surface of the electronic paper 2 faces up (Yes in #166 of FIG. 16), then the image forming apparatus 1 obtains print data 72' of the existing document DCM' from the electronic paper 2 (#167), and deletes the print data 72' from the electronic paper 2 (#168). The image forming apparatus 1, then, creates print data 72C in which the document DCM is combined with the document DCM', and sends the created print data 72C to the electronic paper 2 (#169 and #170). On the other hand, if detecting that the front surface of the electronic paper 2 faces down (No in #166), then the image forming apparatus 1 deletes the print data 72' from the electronic paper 2 (#191), and sends the print data 72A of the document DCM to the electronic paper 2 without combining the document DCM with the document DCM' (#192).

If the image forming apparatus 1 detects that only one piece of electronic paper 2 is placed, and that the power of the electronic paper 2 is turned OFF (Yes in #154, and No in #155), then the image forming apparatus 1 sends a magic packet to the electronic paper 2 to turn ON the electronic paper 2 (#163). The image forming apparatus 1, then, encrypts the print data 72A by using user's password to create encrypted print data 72B, and sends the encrypted print data 72B to the electronic paper (#164 and #165).

Instead of performing the encryption process depending on whether the power of the electronic paper 2 is turned ON or OFF, the image forming apparatus 1 may combine the document DCM with the existing document DCM'. To be specific, in the case where the electronic paper 2 is powered, the image forming apparatus 1 combines the document DCM with the existing document DCM' as with the case where the front surface of the electronic paper 2 faces upward. In the case where the electronic paper 2 is not powered, the image forming apparatus 1 does not combine the document DCM with the existing document DCM' as with the case where the front surface of the electronic paper 2 faces downward.

If the image forming apparatus 1 detects that j (j≥2) pieces of electronic paper 2 are placed as the state shown in FIG. 7B (No in #154, and Yes in #171 of FIG. 17), then the image forming apparatus 1 generates print data 72E for displaying, on a page-by-page basis, a document image of a page which is given, as the page number, a number leaving a remainder of each of 1 through (j−1) and zero when divided by j, and sends the generated print data 72E to each piece of the electronic paper 2 (#172-#175). Alternatively, it is possible for the image forming apparatus 1 to create print data 72F for displaying document images as shown in FIG. 12, and send the created print data 72F to each piece of the electronic paper 2.

If the image forming apparatus 1 detects that k (k≥2) pieces of electronic paper 2 are placed as the state shown in FIG. 8A (Yes in #176), then the image forming apparatus 1 horizontally divides each of the pages of the document DCM into k areas (#177), and generates print data 72G for displaying a document image corresponding to the y-th area from the top of the k areas, and sends the print data 72G to the y-th electronic paper 2 (#178-#181).

If the image forming apparatus 1 detects that a plurality of pieces of electronic paper 2 are arranged so as to form a matrix of j×k as the state shown in FIG. 8B, (Yes in #182 of FIG. 18), then the image forming apparatus 1 generates print data 72H for displaying document images of a document DCM as shown in FIG. 14, and sends the print data 72H to each piece of the electronic paper 2 (#183-#190).

According to this embodiment, a user can perform operation for electronic paper-related processes in a user-friendly manner. Thus, the user can perform the operation more easily than is conventionally possible.

The embodiment describes the example in which the electronic paper 2 is placed on the paper output tray 10ft. Instead, however, the electronic paper 2 may be arranged in another part. For example, the electronic paper 2 may be arranged on the document tray 10gt. In such a case, the digital camera 1DR is so installed that the image of the entire document tray 10gt is captured. Alternatively, the electronic paper 2 may be arranged on the glass plate of the reading portion of the scanner 10g. In such a case, the reading portion preferably captures an image of the electronic paper 2 instead of the digital camera 1DR.

In this embodiment, the image forming apparatus 1 and the electronic paper 2 perform communication with each other via the wireless base station 5. Instead, however, the image forming apparatus 1 and the electronic paper 2 may perform communication with each other without the wireless base station 5. In such a case, the image forming apparatus 1 is preferably provided with an interface for wireless communication.

According to this embodiment, the state of the electronic paper 2 placed on the paper output tray 10ft is detected based on images captured by the digital camera 1DR. Another method may be used for making such detection. In the case where the paper output tray 10ft is inclined instead of being provided horizontally, the electronic paper 2 may be provided with a triaxial accelerometer (gravity sensor), and the state of the electronic paper 2 may be detected based on the measurement result by the triaxial accelerometer. Another configuration is possible in which a touch sensor is provided on the top face of the paper output tray 10ft, and the state of the electronic paper 2 may be detected based on a sensing result by the touch sensor.

In this embodiment, a text password is used for encryption and decryption of image data. Instead, however, biometric information such as fingerprints may be used for the encryption and decryption. Alternatively, ID recorded on an IC card may be used for the encryption and decryption. In such cases, the image forming apparatus 1 and the electronic paper 2 are preferably provided with a fingerprint reader or an IC card reader.

In the foregoing descriptions, a phrase such as "long/short side of the electronic paper is parallel with the side perpendicular to the operation side of the image forming apparatus 1" is given. As long as the angle between the long/short side and the side perpendicular to the operation side is equal to or smaller than a predetermined value, e.g., 5 degrees, the long/short side may be regarded as being parallel with the side perpendicular to the operation side. The same applies to a phrase "lower/short sides of the electronic paper are aligned with each other". To be specific, as long as the distance between the lower/short sides is equal to or smaller than a predetermined value, e.g., 5 centimeters, the lower/short sides of the electronic paper may be regarded as being aligned with each other.

Although the present embodiment provides the eight cases and the two modifications, the embodiment is also applicable to cases other than those discussed above. For example, in the case where a plurality of pieces of electronic paper 2 are arranged as shown in FIG. 8A, and the front surface of each piece of the electronic paper 2 faces downward, the image forming apparatus 1 may encrypt the print data 72 and sends the encrypted print data to the electronic paper 2.

According to this embodiment, the security of the print data 72A is protected by encrypting the print data 72A. Another security measures may be taken against the print data 72A. For example, it is possible to create print data 72A obtained by embedding a background pattern such as "confidential" or "copy" in each page of a document DCM. Another configuration is possible in which, when a scanner attempts to scan electronic paper 2, more specifically, when the electronic paper 2 is irradiated with light having predetermined illumination or more, document DCM is deleted from the electronic paper 2.

In the above-described embodiment, when the power of the electronic paper 2 is turned OFF, a magic packet is transmitted to the electronic paper 2, so that the power thereof is turned from OFF to ON. However, another method is used to turn the power of the electronic paper 2 from OFF to ON. For example, the touchscreen 10e of the image forming apparatus 1 is caused to display a message prompting a user to turn the power of the electronic paper 2 from OFF to ON. In response to the message, the user performs operation for turning the power of the electronic paper 2 from OFF to ON.

In the embodiment discussed above, the overall configurations of the network system NS, the image forming apparatus 1, and the electronic paper 2, the configurations of various portions thereof, the content to be processed, the processing order, the configuration of the data, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An apparatus for outputting an image, the apparatus comprising:
   a detection portion that detects a state of electronic paper placed on a predetermined location; and
   a transmission portion that sends, to the electronic paper, image data for displaying an image depending on the state of the electronic paper, wherein
   if the detection portion detects, as the state, that the electronic paper is placed in such a manner that a first surface of the electronic paper faces upward, then the transmission portion sends the image data without taking security measures to protect the image data, and
   if the detection portion detects, as the state, that the electronic paper is placed in such a manner that a second surface, different from the first surface, of the electronic paper faces upward, then the transmission portion takes the security measures to protect the image data, and sends the image data thus protected.

2. An apparatus for outputting an image, the apparatus comprising:
- a detection portion that detects a state of electronic paper placed on a predetermined location; and
- a transmission portion that sends, to the electronic paper, image data for displaying an image depending on the state of the electronic paper, wherein
- if the detection portion detects, as the state, that the electronic paper is powered, then the transmission portion sends the image data without taking security measures to protect the image data, and
- if the detection portion detects, as the state, that the electronic paper is not powered, then the transmission portion takes the security measures to protect the image data, and sends the image data thus protected.

3. An apparatus for outputting an image, the apparatus comprising:
- a detection portion that detects a state of electronic paper placed on a predetermined location; and
- a transmission portion that sends, to the electronic paper, image data for displaying an image depending on the state of the electronic paper, wherein
- if the detection portion detects, as the state, that the electronic paper is placed in such a manner that a first surface of the electronic paper faces upward, then the transmission portion sends the image data in a manner to display both the image and another image that is already stored in the electronic paper, and
- if the detection portion detects, as the state, that the electronic paper is placed in such a manner that a second surface, different from the first surface, of the electronic paper faces upward, then the transmission portion causes the electronic paper to delete said another image from the electronic paper, and sends the image data.

4. An apparatus for outputting an image, the apparatus comprising:
- a detection portion that detects a state of electronic paper placed on a predetermined location; and
- a transmission portion that sends, to the electronic paper, image data for displaying an image depending on the state of the electronic paper, wherein
- if the detection portion detects, as the state, that the electronic paper is powered, then the transmission portion sends the image data in a manner to display both the image and another image that is already stored in the electronic paper, and
- if the detection portion detects, as the state, that the electronic paper is not powered, then the transmission portion causes the electronic paper to delete said another image from the electronic paper, and sends the image data.

5. An apparatus for outputting an image, the apparatus comprising:
- a detection portion that detects a state of electronic paper placed on a predetermined location; and
- a transmission portion that sends, to the electronic paper, image data for displaying an image depending on the state of the electronic paper, wherein
- the image corresponds to each of document images of a document including a plurality of pages each of whose long sides corresponds to an up-down direction of the page,
- if the detection portion detects that the electronic paper is placed in such a manner that a long side of a screen of the electronic paper corresponds to a side perpendicular to an operation side of the apparatus by a user, then the transmission portion sends, as the image data, data for displaying the document images on a page-by-page basis, and
- if the detection portion detects that the electronic paper is placed in such a manner that a short side of the screen of the electronic paper corresponds to the side perpendicular to the operation side of the apparatus, then the transmission portion sends, as the image data, data for displaying the document images for two of the pages.

6. An apparatus for outputting an image, the apparatus comprising:
- a detection portion that detects a state of electronic paper placed on a predetermined location; and
- a transmission portion that sends, to the electronic paper, image data for displaying an image depending on the state of the electronic paper, wherein
- the image corresponds to each of document images of a document including a plurality of pages, and
- if the detection portion detects that a plurality of pieces of electronic paper are aligned with one another, then the transmission portion sends, as the image data, data for displaying the document images corresponding to successive pages of the document in accordance with an order in which the plurality of pieces of electronic paper are aligned.

7. A method for outputting an image, the method comprising:
- causing an apparatus for outputting an image to perform a first process of detecting a state of electronic paper placed on a predetermined location; and
- causing the apparatus to perform a second process of sending, to the electronic paper, image data for displaying an image depending on the state of the electronic paper, wherein
- if it is detected in the first process, as the state, that the electronic paper is placed in such a manner that a first surface of the electronic paper faces upward, then the apparatus is caused to perform, as the second process, a process of sending the image data without taking security measures to protect the image data, and
- if it is detected in the first process, as the state, that the electronic paper is placed in such a manner that a second surface, different from the first surface, of the electronic paper faces upward, then the apparatus is caused to perform, as the second process, a process of taking the security measures to protect the image data and sending the image data thus protected.

8. A method for outputting an image, the method comprising:
- causing an apparatus for outputting an image to perform a first process of detecting a state of electronic paper placed on a predetermined location; and
- causing the apparatus to perform a second process of sending, to the electronic paper, image data for displaying an image depending on the state of the electronic paper, wherein
- if it is detected in the first process, as the state, that the electronic paper is powered, then the apparatus is caused to perform, as the second process, a process of sending the image data without taking security measures to protect the image data, and
- if it is detected in the first process, as the state, that the electronic paper is not powered, then the apparatus is caused to perform, as the second process, a process of taking the security measures to protect the image data and sending the image data thus protected.

9. A method for outputting an image, the method comprising:
- causing an apparatus for outputting an image to perform a first process of detecting a state of electronic paper placed on a predetermined location; and
- causing the apparatus to perform a second process of sending, to the electronic paper, image data for displaying an image depending on the state of the electronic paper, wherein
- if it is detected in the first process, as the state, that the electronic paper is placed in such a manner that a first surface of the electronic paper faces upward, then the apparatus is caused to perform, as the second process, a process of sending the image data in a manner to display both the image and another image that is already stored in the electronic paper, and
- if it is detected in the first process, as the state, that the electronic paper is placed in such a manner that a second surface, different from the first surface, of the electronic paper faces upward, then the apparatus is caused to perform, as the second process, a process of causing the electronic paper to delete said another image from the electronic paper, and sending the image data.

10. A method for outputting an image, the method comprising:
- causing an apparatus for outputting an image to perform a first process of detecting a state of electronic paper placed on a predetermined location; and
- causing the apparatus to perform a second process of sending, to the electronic paper, image data for displaying an image depending on the state of the electronic paper, wherein
- if it is detected in the first process, as the state, that the electronic paper is powered, then the apparatus is caused to perform, as the second process, a process of sending the image data in a manner to display both the image and another image that is already stored in the electronic paper, and
- if it is detected in the first process, as the state, that the electronic paper is not powered, then the apparatus is caused to perform, as the second process, a process of causing the electronic paper to delete said another image from the electronic paper, and sending the image data.

11. A method for outputting an image, the method comprising:
- causing an apparatus for outputting an image to perform a first process of detecting a state of electronic paper placed on a predetermined location; and
- causing the apparatus to perform a second process of sending, to the electronic paper, image data for displaying an image depending on the state of the electronic paper, wherein
- the image corresponds to each of document images of a document including a plurality of pages each of whose long sides corresponds to an up-down direction of the page,
- if it is detected in the first process that the electronic paper is placed in such a manner that a long side of a screen of the electronic paper corresponds to a side perpendicular to an operation side of the apparatus by a user, then the apparatus is caused to perform, as the second process, a process of sending, as the image data, data for displaying the document images on a page-by-page basis, and
- if it is detected in the first process that the electronic paper is placed in such a manner that a short side of the screen of the electronic paper corresponds to the side perpendicular to the operation side of the apparatus, then the apparatus is caused to perform, as the second process, a process of sending, as the image data, data for displaying the document images for two of the pages.

12. A method for outputting an image, the method comprising:
- causing an apparatus for outputting an image to perform a first process of detecting a state of electronic paper placed on a predetermined location; and
- causing the apparatus to perform a second process of sending, to the electronic paper, image data for displaying an image depending on the state of the electronic paper, wherein
- the image corresponds to each of document images of a document including a plurality of pages, and
- if it is detected in the first process that a plurality of pieces of electronic paper are aligned with one another, then the apparatus is caused to perform, as the second process, a process of sending, as the image data, data for displaying the document images corresponding to successive pages of the document in accordance with an order in which the plurality of pieces of electronic paper are aligned.

13. A non-transitory computer-readable storage medium storing thereon a computer program used in an apparatus for outputting an image, the computer program causing the apparatus to perform:
- a first process of detecting a state of electronic paper placed on a predetermined location; and
- a second process of sending, to the electronic paper, image data for displaying an image depending on the state of the electronic paper, wherein
- if it is detected in the first process, as the state, that the electronic paper is placed in such a manner that a first surface of the electronic paper faces upward, then the apparatus is caused to perform, as the second process, a process of sending the image data without taking security measures to protect the image data, and
- if it is detected in the first process, as the state, that the electronic paper is placed in such a manner that a second surface, different from the first surface, of the electronic paper faces upward, then the apparatus is caused to perform, as the second process, a process of taking the security measures to protect the image data and sending the image data thus protected.

14. A non-transitory computer-readable storage medium storing thereon a computer program used in an apparatus for outputting an image, the computer program causing the apparatus to perform:
- a first process of detecting a state of electronic paper placed on a predetermined location; and
- a second process of sending, the electronic paper, image data for displaying an image depending on the state of the electronic paper, wherein
- if it is detected in the first process, as the state, that the electronic paper is powered, then the apparatus is caused to perform, as the second process, a process of sending the image data without taking security measures to protect the image data, and
- if it is detected in the first process, as the state, that the electronic paper is not powered, then the apparatus is caused to perform, as the second process, a process of taking the security measures to protect the image data and sending the image data thus protected.

15. A non-transitory computer-readable storage medium storing thereon a computer program used in an apparatus for outputting an image, the computer program causing the apparatus to perform:

a first process of detecting a state of electronic paper placed on a predetermined location; and a second process of sending, to the electronic paper, image data for displaying an image depending on the state of the electronic paper, wherein if it is detected in the first process, as the state, that the electronic paper is placed in such a manner that a first surface of the electronic paper faces upward, then the apparatus is caused to perform, as the second process, a process of sending the image data in a manner to display both the image and another image that is already stored in the electronic paper, and if it is detected in the first process, as the state, that the electronic paper is placed in such a manner that a second surface, different from the first surface, of the electronic paper faces upward, then the apparatus is caused to perform, as the second process, a process of causing the electronic paper to delete said another image from the electronic paper, and sending the image data.

16. A non-transitory computer-readable storage medium storing thereon a computer program used in an apparatus for outputting an image, the computer program causing the apparatus to perform:

a first process of detecting a state of electronic paper placed on a predetermined location; and a second process of sending, to the electronic paper, image data for displaying an image depending on the state of the electronic paper, wherein if it is detected in the first process, as the state, that the electronic paper is powered, then the apparatus is caused to perform, as the second process, a process of sending the image data in a manner to display both the image and another image that is already stored in the electronic paper, and if it is detected in the first process, as the state, that the electronic paper is not powered, then the apparatus is caused to perform, as the second process, a process of causing the electronic paper to delete said another image from the electronic paper, and sending the image data.

17. A non-transitory computer-readable storage medium storing thereon a computer program used in an apparatus for outputting an image, the computer program causing the apparatus to perform:

a first process of detecting a state of electronic paper placed on a predetermined location; and a second process of sending, to the electronic paper, image data for displaying an image depending on the state of the electronic paper, wherein the image corresponds to each of document images of a document including a plurality of pages each of whose long sides corresponds to an up-down direction of the page, if it is detected in the first process that the electronic paper is placed in such a manner that a long side of a screen of the electronic paper corresponds to a side perpendicular to an operation side of the apparatus by a user, then the apparatus is caused to perform, as the second process, a process of sending, as the image data, data for displaying the document images on a page-by-page basis, and if it is detected in the first process that the electronic paper is placed in such a manner that a short side of the screen of the electronic paper corresponds to the side perpendicular to the operation side of the apparatus, then the apparatus is caused to perform, as the second process, a process of sending, as the image data, data for displaying the document images for two of the pages.

18. A non-transitory computer-readable storage medium storing thereon a computer program used in an apparatus for outputting an image, the computer program causing the apparatus to perform:

a first process of detecting a state of electronic paper placed on a predetermined location; and a second process of sending, to the electronic paper, image data for displaying an image depending on the state of the electronic paper, wherein the image corresponds to each of document images of a document including a plurality of pages, and if it is detected in the first process that a plurality of pieces of electronic paper are aligned with one another, then the apparatus is caused to perform, as the second process, a process of sending, as the image data, data for displaying the document images corresponding to successive pages of the document in accordance with an order in which the plurality of pieces of electronic paper are aligned.

* * * * *